US008955855B2

(12) United States Patent
Herlitz et al.

(10) Patent No.: US 8,955,855 B2
(45) Date of Patent: Feb. 17, 2015

(54) INFANT WAGON

(75) Inventors: Todd Herlitz, Chicago, IL (US);
Katherine Powers, Chicago, IL (US);
Mark Johnson, Cary, IL (US); Emily Rivard, Chicago, IL (US); Matt Young, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 13/342,779

(22) Filed: Jan. 3, 2012

(65) Prior Publication Data

US 2012/0235372 A1 Sep. 20, 2012

Related U.S. Application Data

(60) Provisional application No. 61/429,333, filed on Jan. 3, 2011.

(51) Int. Cl.
| | |
|---|---|
| B62B 7/12 | (2006.01) |
| B62B 7/04 | (2006.01) |
| B62B 9/08 | (2006.01) |
| B62B 9/10 | (2006.01) |
| B62B 9/14 | (2006.01) |
| B62B 9/20 | (2006.01) |
| B62B 5/06 | (2006.01) |

(Continued)

(52) U.S. Cl.
CPC ... B62B 7/12 (2013.01); B62B 7/04 (2013.01); B62B 9/087 (2013.01); B62B 9/104 (2013.01); B62B 9/108 (2013.01); B62B 9/14 (2013.01); B62B 9/20 (2013.01); B62B 5/067 (2013.01); B62B 9/28 (2013.01); B62B 3/1452 (2013.01); B62B 2205/10 (2013.01); B62B 2301/044 (2013.01); B62B 2301/05 (2013.01); B62B 2206/006 (2013.01)

USPC ............. 280/47.38; 280/32.5; 297/184.1; 297/135

(58) Field of Classification Search
None
See application file for complete search history.

(56) References Cited

U.S. PATENT DOCUMENTS

| | | | |
|---|---|---|---|
| 2,532,004 A | 11/1950 | Zepp | |
| 4,265,461 A | 5/1981 | Okubo | |
| 4,735,426 A * | 4/1988 | McConnell | 280/87.01 |

(Continued)

FOREIGN PATENT DOCUMENTS

EP 1 847 437 A2 10/2007

OTHER PUBLICATIONS

Radio Flyer Pathfinder: Retrieved on Nov. 12, 2010 from: http://www.amazon.com/Radio-Flyer-Pathfinder-Wagon%C2%AE-Red/dp/B0000859QK%3FSubscriptionId%3DAKIAIQF34XORTUHI-VHHA%26tag%3Diowestpricesusa-20%26linkCode%3Dxm2%26camp%3D2025%26-creative%3D165953%26creativeASIN%3DB0000859QK.

(Continued)

*Primary Examiner* — J. Allen Shriver, II
*Assistant Examiner* — Hilary L Johns
(74) *Attorney, Agent, or Firm* — McDermott Will & Emery LLP

(57) ABSTRACT

An infant wagon includes a body having a seating surface. A number of wheels and a handle are attached to the body. A seatback is pivotally attached to the body adjacent to the seating surface. The seatback may be pivoted between a folded position where the seating surface is covered, an upright position and a reclined position. An infant seat is removably attached to the seatback when in the reclined position.

24 Claims, 28 Drawing Sheets

(51) Int. Cl.
*B62B 9/28* (2006.01)
*B62B 3/14* (2006.01)

(56) References Cited

U.S. PATENT DOCUMENTS

| | | | |
|---|---|---|---|
| 5,480,180 A | 1/1996 | Fuller et al. | |
| D369,629 S | 5/1996 | Pasin et al. | |
| 5,529,323 A | 6/1996 | Vom Braucke et al. | |
| 5,538,267 A | 7/1996 | Pasin et al. | |
| D382,309 S | 8/1997 | Brown et al. | |
| D389,877 S | 1/1998 | Pasin | |
| 5,752,738 A * | 5/1998 | Onishi et al. | 297/61 |
| 5,833,251 A * | 11/1998 | Peck | 280/87.01 |
| 5,957,482 A | 9/1999 | Shorter | |
| 6,318,740 B1 | 11/2001 | Nappo | |
| D458,648 S | 6/2002 | Chiappetta et al. | |
| 6,446,981 B1 | 9/2002 | Wise et al. | |
| 6,497,424 B2 | 12/2002 | Gartner et al. | |
| 6,601,860 B2 | 8/2003 | Potter | |
| 6,641,149 B2 | 11/2003 | Chiappetta et al. | |
| 6,708,992 B1 * | 3/2004 | Vargas | 280/47.38 |
| 6,932,365 B2 * | 8/2005 | Chiappetta et al. | 280/47.371 |
| D547,391 S | 7/2007 | Johnson et al. | |
| D564,039 S | 3/2008 | Rodriguez et al. | |
| D566,200 S | 4/2008 | Seckel et al. | |
| 7,487,977 B2 * | 2/2009 | Johnson | 280/47.34 |
| 8,641,057 B2 | 2/2014 | Herlitz et al. | |
| 2004/0075229 A1 * | 4/2004 | Huntley | 280/47.38 |
| 2005/0242535 A1 * | 11/2005 | Chen | 280/47.38 |
| 2007/0216120 A1 * | 9/2007 | Bothun et al. | 280/79.11 |
| 2009/0127827 A1 * | 5/2009 | Pike et al. | 280/648 |

OTHER PUBLICATIONS

Step 2 Wagon: Retrieved on Nov. 12, 2010 from: http://www.littletikesplay.com/step2/step-2-wagon-for-two-plus-willow-green.html.

* cited by examiner

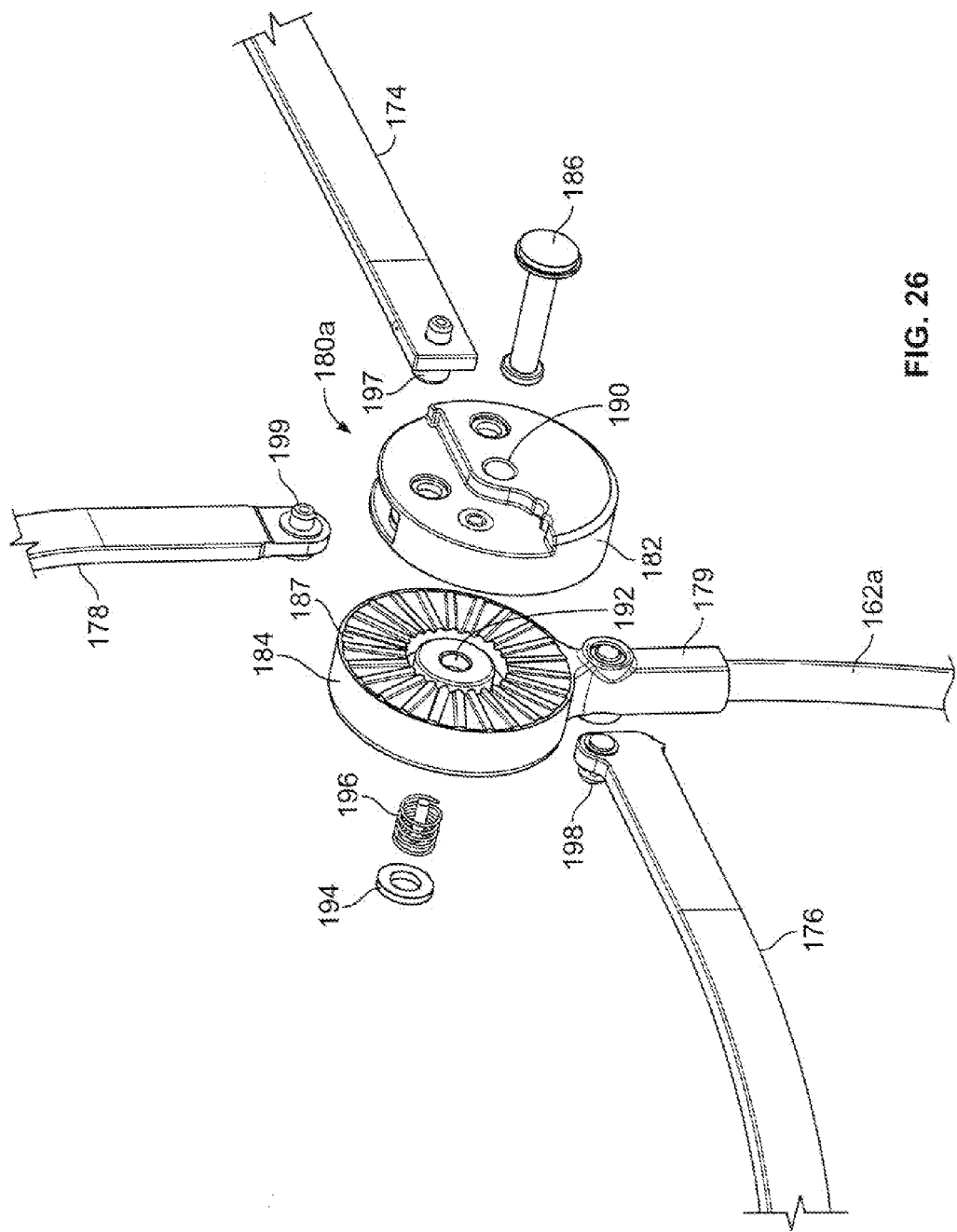

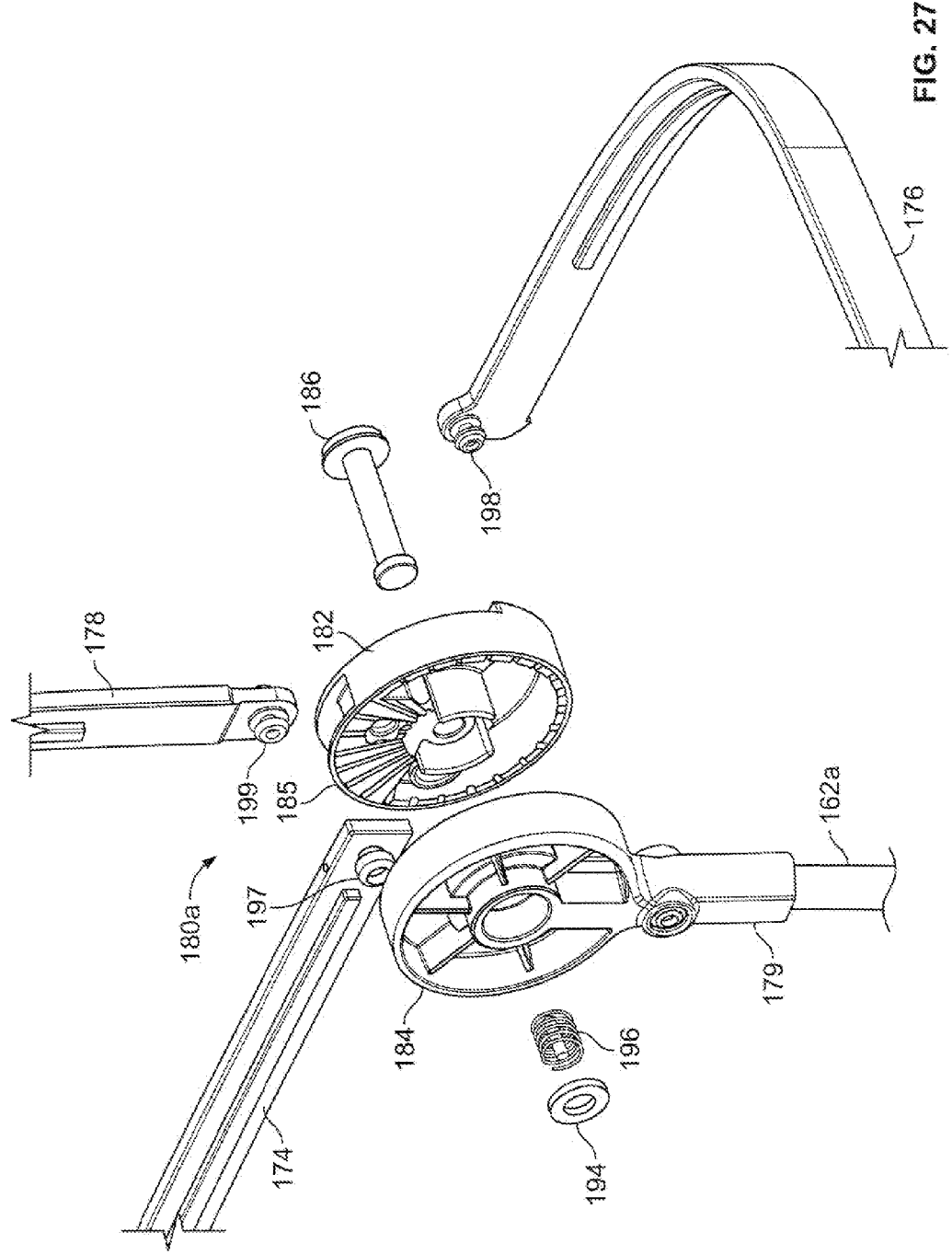

INFANT WAGON

CLAIM OF PRIORITY

This application claims priority to provisional patent application No. 61/429,333, filed Jan. 3, 2011.

FIELD OF THE INVENTION

The present invention relates to wagons and, more particularly, to a convertible wagon that may be configured to carry infants.

BACKGROUND

Wagons are popular toys that have been enjoyed by children for many years. In addition to providing exercise and enjoyment for children, wagons provide utility in that cargo may be carried in the bed of the wagon. Children may also ride in the bed of the wagon while being pulled or pushed by an adult.

Wagons featuring built-in seating surfaces with folding seatbacks have been developed to improve the comfort and convenience of child passengers. An example of such a convertible wagon is presented in commonly owned U.S. Pat. No. 6,932,365 to Chiappetta et al. In addition to providing improved functionality as a child carrier, the folding seatbacks, when folded, provide the wagon with a flat cargo surface and a separate storage space in the lower portion of the wagon body. As a result, the wagon of the '365 patent features great versatility and may be configured as best suited for the intended use.

While the wagon of the '365 patent performs well, it is desirable to provide a wagon that can also easily accommodate infants. It is also desirable to provide a wagon for infants that can be reconfigured to accommodate older children or cargo. Such a wagon could be substituted for a stroller in many situations while still providing the versatility, in alternative configurations, of a wagon. Such a wagon would therefore effectively "grow" to accommodate a growing family's needs.

BRIEF DESCRIPTION OF THE DRAWINGS

FIG. 26 is an exploded outer perspective view of one of the canopy ratchet mechanisms of the wagon of FIG. 1;

FIG. 27 is an exploded inner perspective view of the canopy ratchet mechanism of FIG. 26;

DETAILED DESCRIPTION OF EMBODIMENTS

Figure 1:
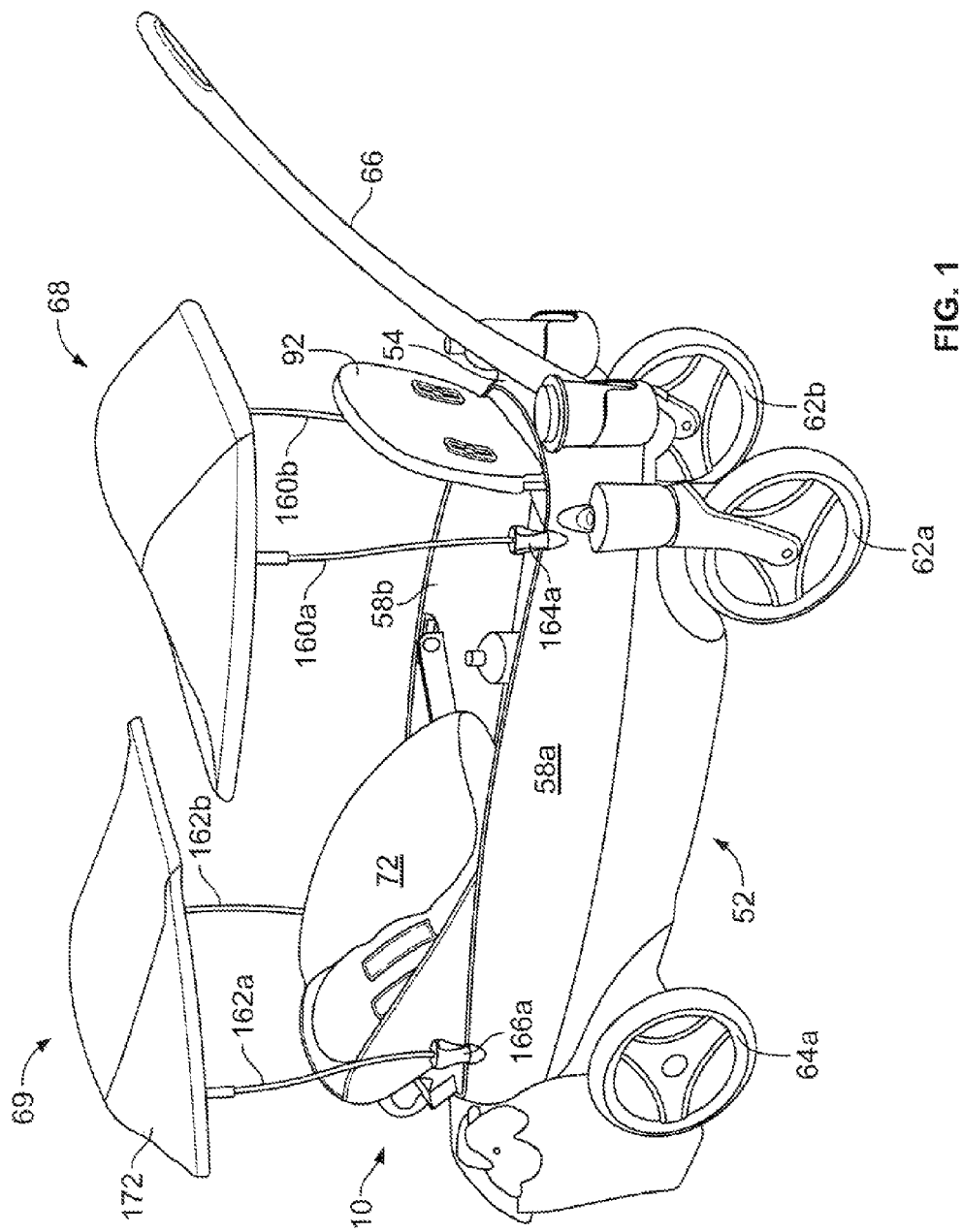
FIG. 1 is a perspective view of an embodiment of the infant wagon of the present invention with the infant seat and front and rear canopies installed.

An embodiment of the infant wagon of the invention is indicated in general at 50 in FIG. 1. As illustrated in FIGS. 1-5, the wagon features a body, indicated in general at 52, that includes a front wall 54, a rear wall 56 and opposing sidewalls 58a and 58b. As illustrated in FIG. 4, the wagon body also features a floor 60 and a front seating surface 61 and a rear seating surface 63. The front, rear and opposing sidewalls, floor and opposing seating surfaces define an interior of the wagon. The body is preferably constructed from molded plastic, but alternative generally rigid and durable materials may be used.

Figure 3:
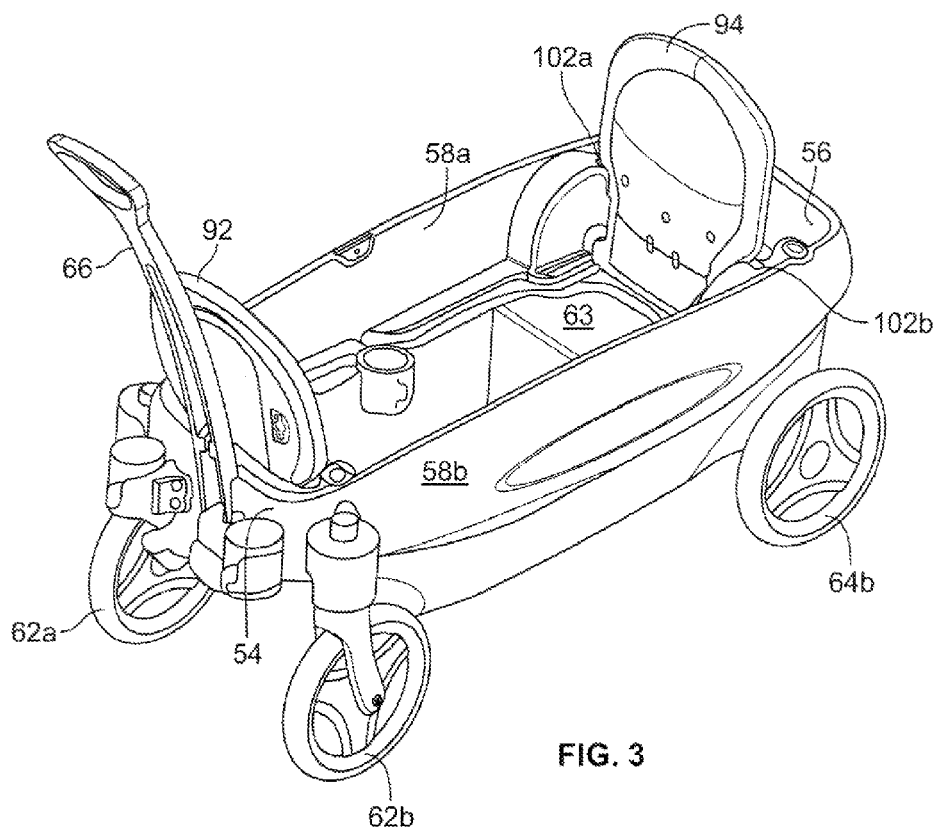
FIG. 3 is a perspective view of the wagon of FIG. 1 with the infant seat and front and rear canopies removed, and the rear seatback in the upright position.
Figure 4:
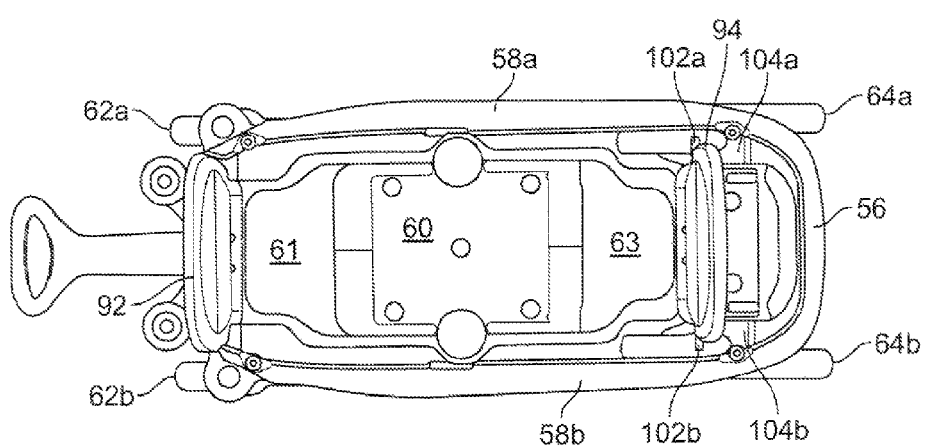
FIG. 4 is a top plan view of the wagon of FIG. 3.

As illustrated in FIG. 1, the wagon body is supported on a surface by a pair of front wheels 62a and 62b and a pair of rear wheels 64a and 64b (FIG. 3). A handle 66 is pivotally attached to the front wall 54 of the wagon body. As will be described in greater detail below, a front canopy 68 and a rear canopy 69 are attached to the wagon body and an infant seat 72 is also removably positioned within the wagon interior.

Figure 2:
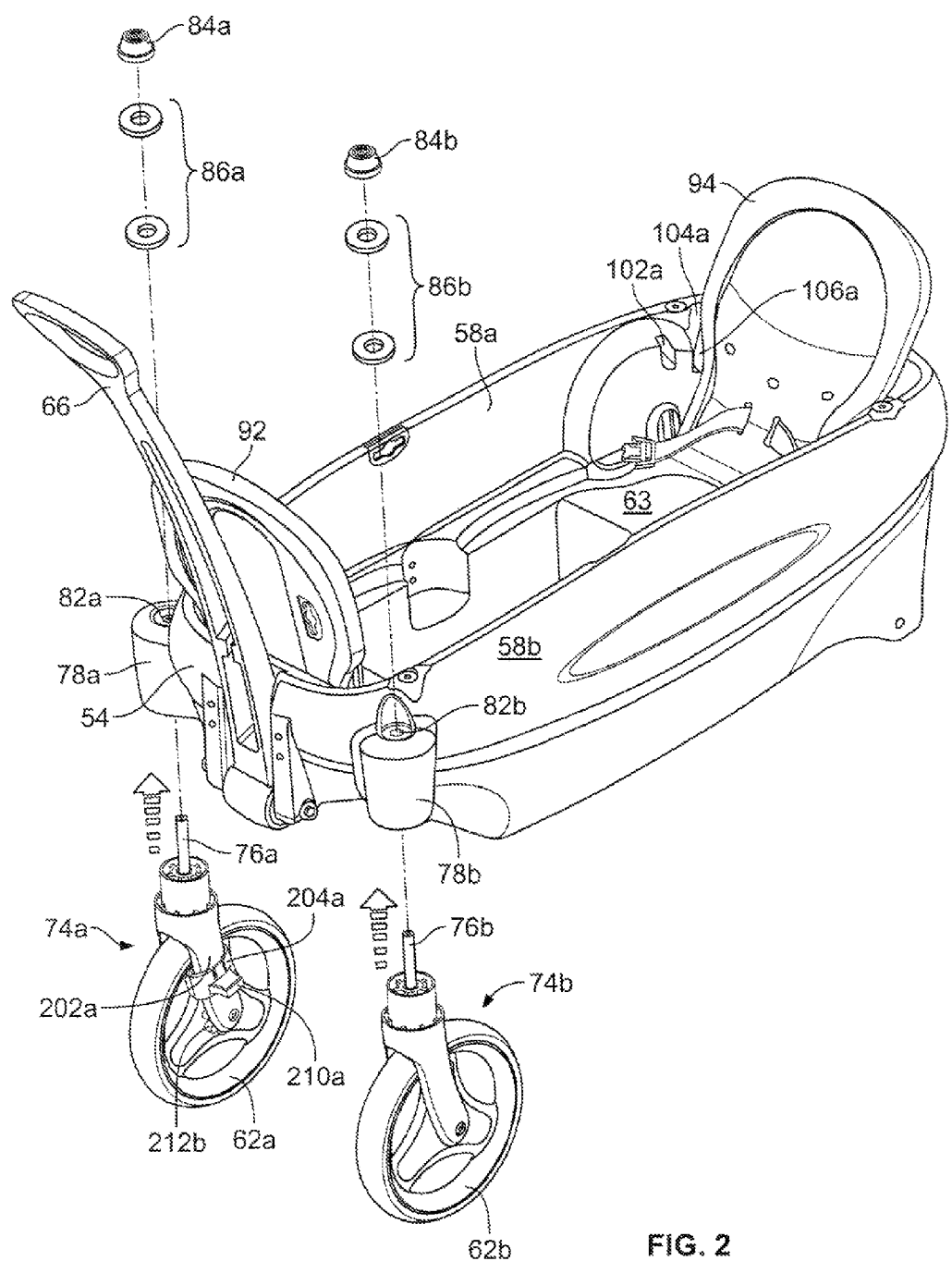
FIG. 2 is an exploded perspective view of the front portion of the wagon of FIG. 1, with the infant seat and front and rear canopies removed, showing assembly of the front casters to the wagon.

The front wheels of the wagon are attached to the wagon body by a caster arrangement, as illustrated in FIG. 2. More specifically, the front wheels 62a and 62b are rotatably positioned within caster bodies 74a and 74b, respectively. As is clear from FIG. 2, each caster body features an inner fork and outer fork between which the corresponding caster wheel is received. Caster stems 76a and 76b are attached to the tops of caster bodies 74a and 74b. The wagon body features a pair of caster supports 78a and 78b featuring bores 82a and 82b which receive caster stems 76a and 76b, respectively so that wheels 62a and 62b are free to pivot 360° about a vertical axis passing through the caster stems. Locking caps 84a and 84b are positioned on the top ends of the caster stems 76a and 76b, respectively, after washers 86a and 86b are placed on the top portions of the caster stems.

As illustrated in FIGS. 1-5, a front seatback 92 and a rear seatback 94 are pivotally secured by their bottom ends within the interior of the wagon. Front seatback 92 is positioned adjacent to the leading edge of seating surface 61, while rear seatback 94 is positioned adjacent to the trailing edge of seating surface 63 (as best seen in FIG. 4). As disclosed in commonly owned U.S. Pat. No. 6,932,365 to Chiappetta et al., the contents of which are hereby incorporated by reference, the front seatback is pivotally secured to the body of the by a pair of pins extending horizontally from the bottom side edges of the seatback and engaging corresponding openings formed in the interior surfaces of sidewalls 58a and 58b.

Figure 5:
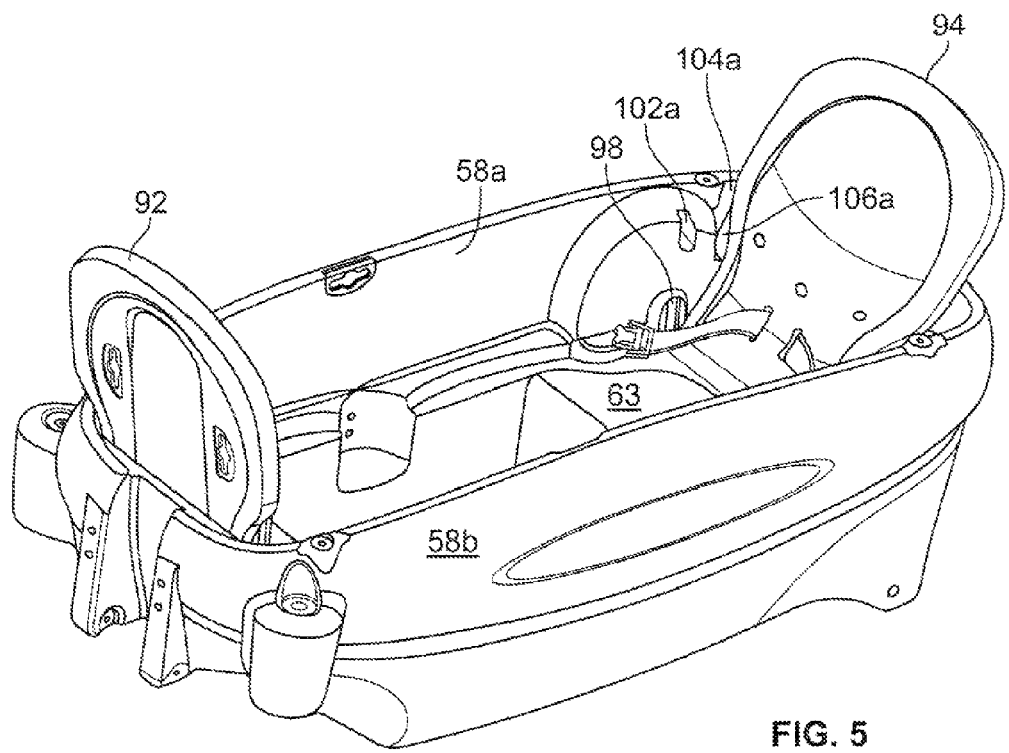
FIG. 5 is a perspective view of the body and seatbacks of the wagon of FIGS. 1-4 with the rear seat in the reclined position.
Figure 6:
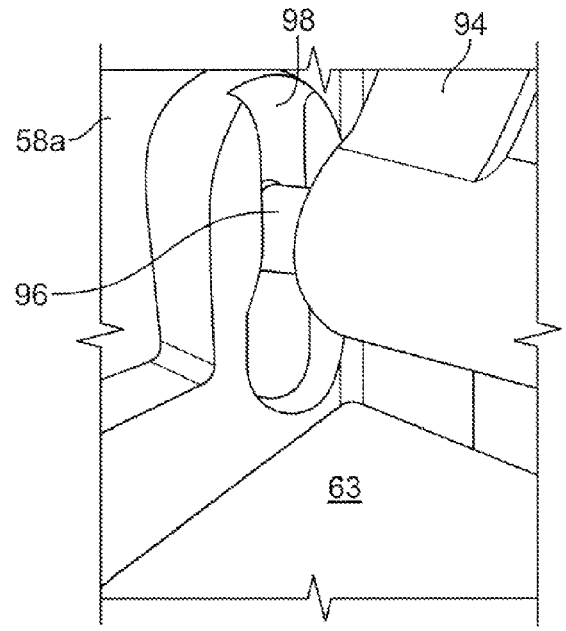
FIG. 6 is an enlarged transparent perspective view of one of the hinge pins and hinge slots of the rear seatback of the wagon of FIGS. 1-5.

The bottom side edge of the rear seatback 94 also features a pair of pins extending horizontally outwards, as illustrated by pin 96 in FIG. 6. As illustrated in FIG. 6 (and FIG. 5), the pin 96 is received within a slot 98 that is formed within the sidewall 58a of the wagon. The slot is sized so as to permit the pin 96 to travel upwards and downwards therein. Sidewall 58b of the wagon is equipped with a similar slot and receives a similar pin extending from the opposing bottom side edge of the rear seatback 94.

Figure 7:
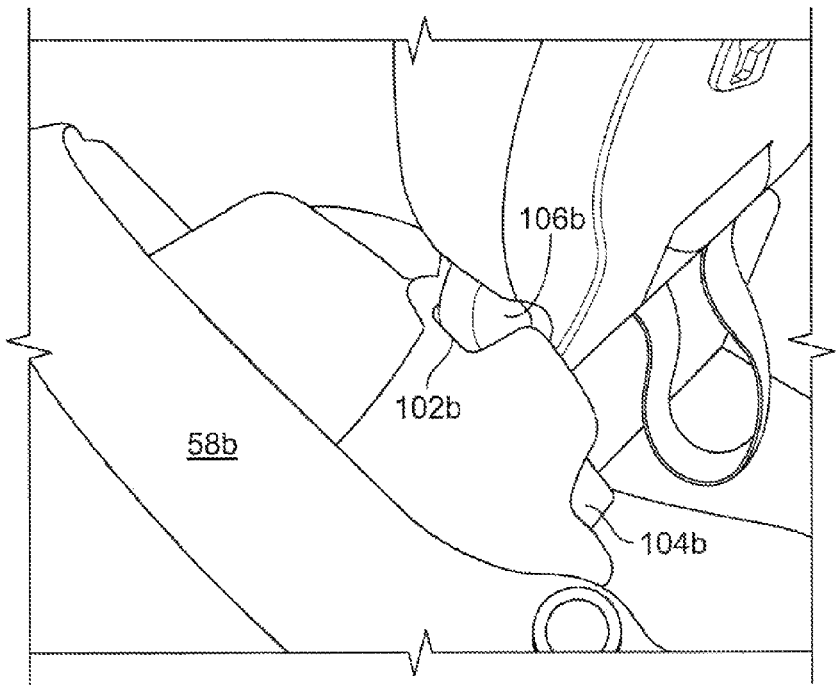
FIG. 7 is an enlarged perspective view of the side edge and wing of the rear seatback of the wagon of FIGS. 3 and 4 with the rear seatback in the upright position.
Figure 8:
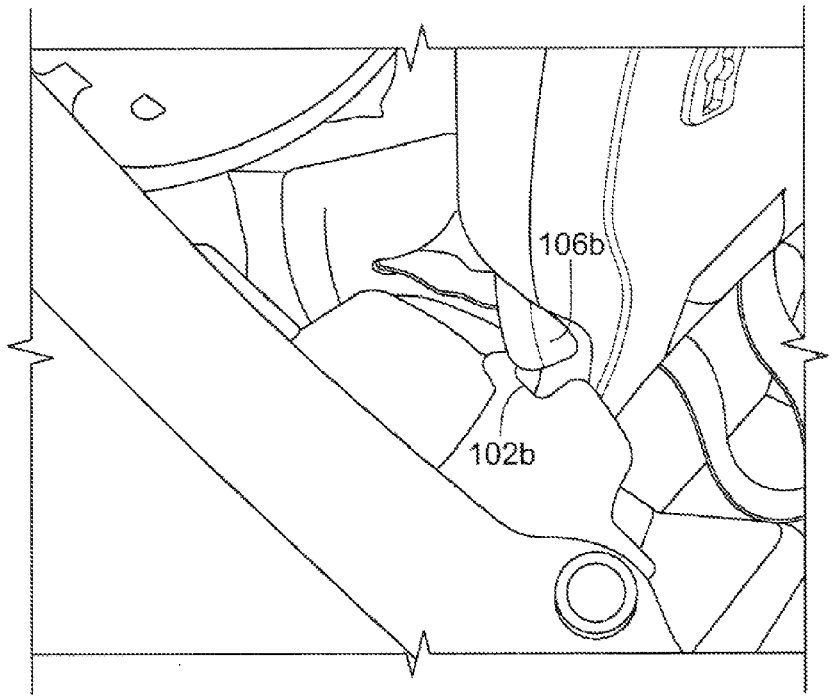
FIG. 8 is a perspective view of the rear seatback of FIG. 7 after being lifted from the upright position and ready for movement into either the folded position or the reclined position.
Figure 10:
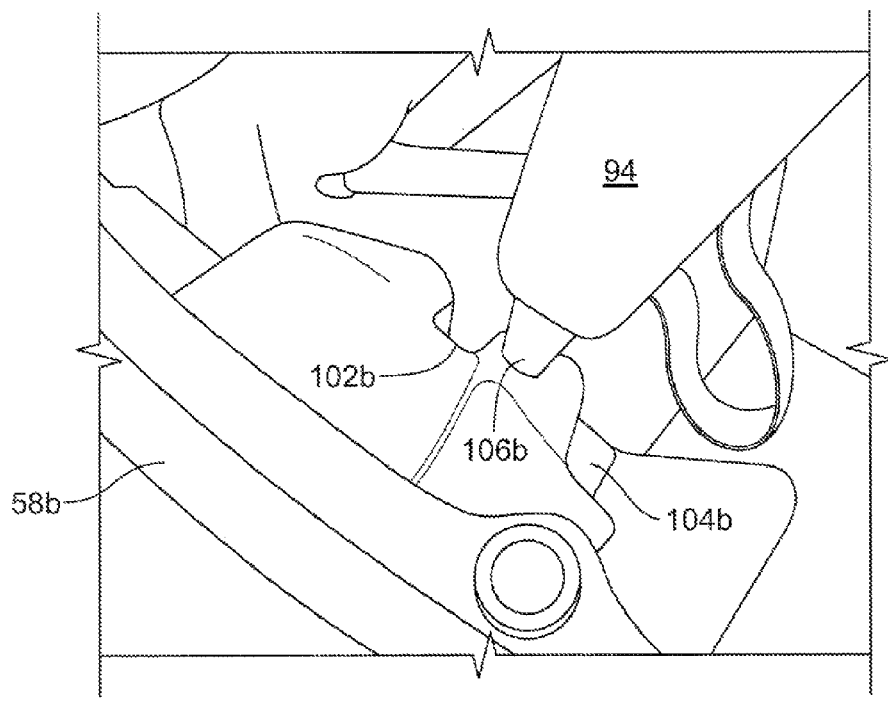
FIG. 10 is a perspective view of the rear seatback of FIG. 8 in the process of being moved from the position of FIG. 8 to the reclined position.

As illustrated in FIGS. 2-5 and 7, the sidewalls 58a and 58b of the wagon are also provided with opposing front slots 102a and 102b and rear slots 104a and 104b. As illustrated in FIGS. 2 and 5, the right edge of rear seatback 94 is provided with a wing 106a, while, as illustrated in FIGS. 7, 8 and 10, the left edge of rear seatback 94 is provided with a wing 106b. When the front seatback 82 and rear seatback 94 are configured in the upright positions, illustrated in FIGS. 3 and 4, children may ride facing each other while seated on seating surfaces 61 and 63, with their feet positioned on wagon floor 60 (FIG. 4).

Figure 9:
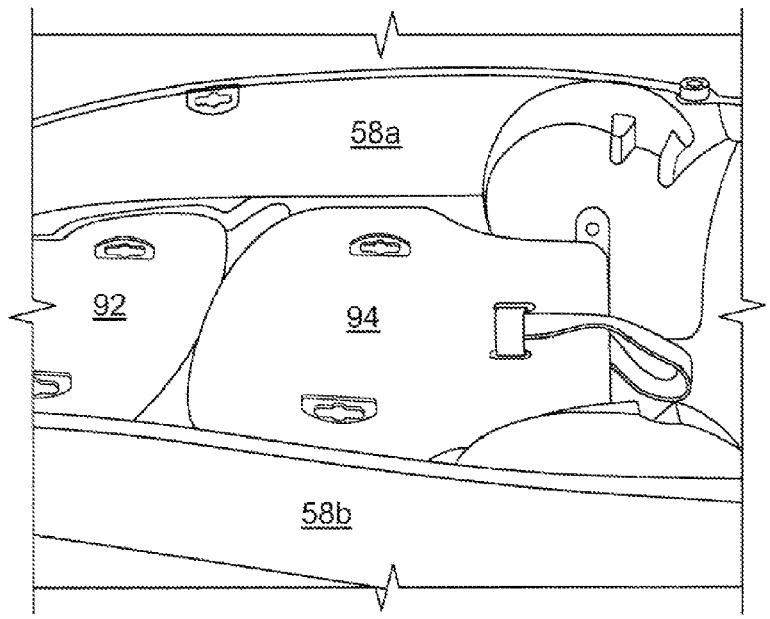
FIG. 9 is an enlarged perspective view of the seatbacks of the wagon of FIGS. 1-8 with the seatbacks in the folded position.

The wagon provides a flat surface for hauling cargo by pivoting the front and rear seatbacks 92 and 94 towards one another and into the position illustrated in FIG. 9. Front seatback 92 may be simply pivoted clockwise from the position shown in FIGS. 1-5 into the folded position shown in FIG. 9.

To fold rear seatback 94 from the upright position shown in FIGS. 3 and 4 to the folded position shown in FIG. 9, the rear seatback must first be lifted, as illustrated in FIG. 8, so that the wings 106a and 106b of the rear seatback 94 slide up and out of front slots 102a and 102b of the wagon body sidewalls 58a and 58b. As this occurs, pin 96 of FIG. 6 travels upwards to the top portion of slot 98. The pin on the opposite side edge similarly travels upwards in the corresponding slot formed in sidewall 58b.

Once the rear seatback 94 is in the position shown in FIG. 8, it may be pivoted counterclockwise (towards the front of the wagon) into the folded position shown in FIG. 9. Alternatively, the rear seatback 94 may be pivoted clockwise (towards the rear of the wagon), as illustrated in FIG. 10, and into the reclined position, illustrated in FIGS. 2 and 5. In this position, the side wings 106a and 106b of the seatback 94 engage the rear slots 104a and 104b formed in wagon sidewalls 58a and 58b.

Figure 11:
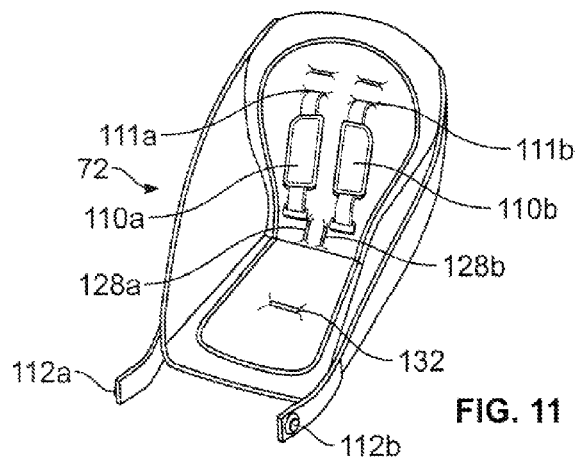
FIG. 11 is a perspective view of the infant seat of the wagon of FIG. 1.

With the rear seatback 94 in the reclined position illustrated in FIGS. 2 and 5, the infant seat of the wagon, indicated in general at 72 in FIG. 11, may be installed. With reference to FIG. 11, the infant seat 72, which is preferably constructed from fabric, webbing and padding, includes a pair of shoulder straps 110a and 110b. Each strap passes through a slot 111a and 111b formed in the seatback of the infant seat.

Figure 12:
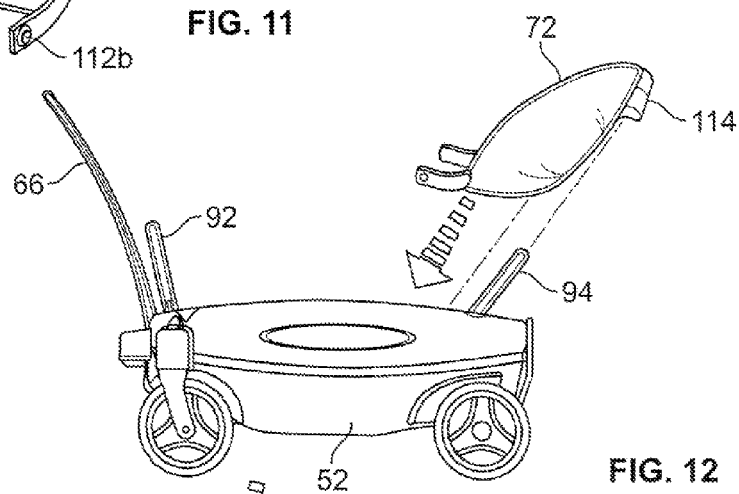
FIGS. 12 and 13 are side elevational and perspective views, respectively, illustrating installation of the infant seat of FIG. 11 on the wagon of FIGS. 1-8.
Figure 14:
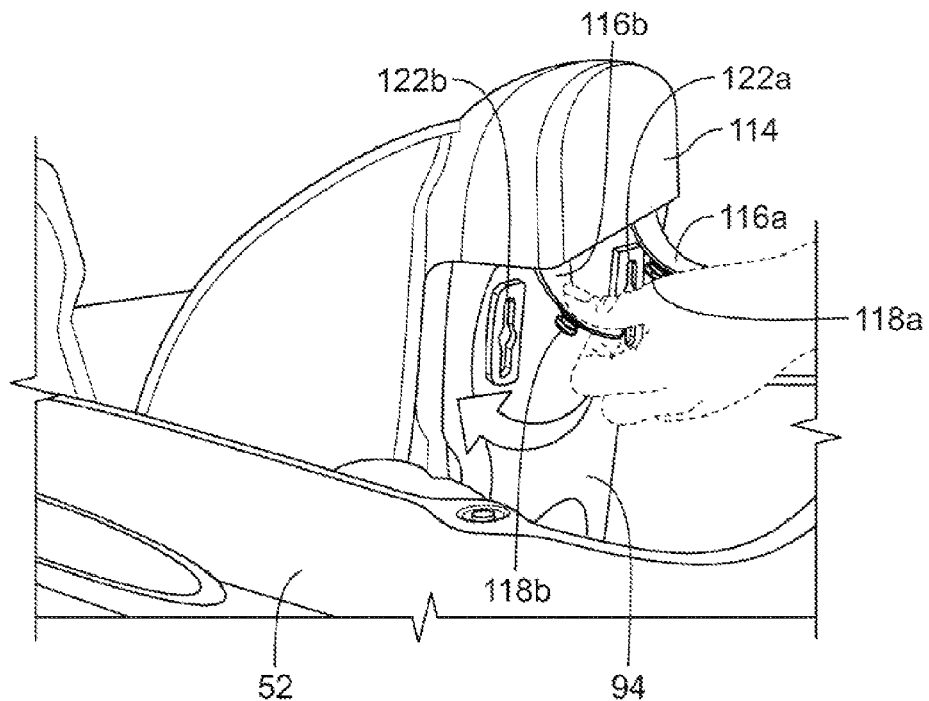
FIGS. 14 and 15 are a perspective view and enlarged perspective view, respectively, of the back side of the rear seat back of the wagon of FIGS. 1-8 illustrating installation of the infant seat of FIG. 11 on the wagon of FIGS. 1-8.

As illustrated in FIG. 11, the infant seat also includes a pair of front wagon attachment straps 112a and 112b. As illustrated in FIGS. 12 and 14, the rear side of the infant seatback is provided with a pocket 114, having an open bottom, and a pair of rear wagon attachment straps 116a and 116b. As will be explained in greater detail below, the distal ends of straps 112a, 112b, 116a and 116b are each provided with a fastener that engages corresponding slots positioned on the interior surfaces of the wagon sidewalls and the rear side of rear seatback 94.

Figure 13:
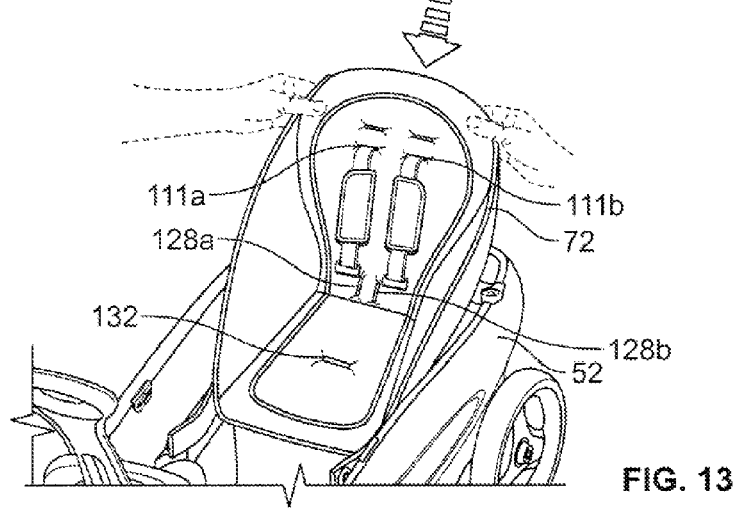
Figure 15:
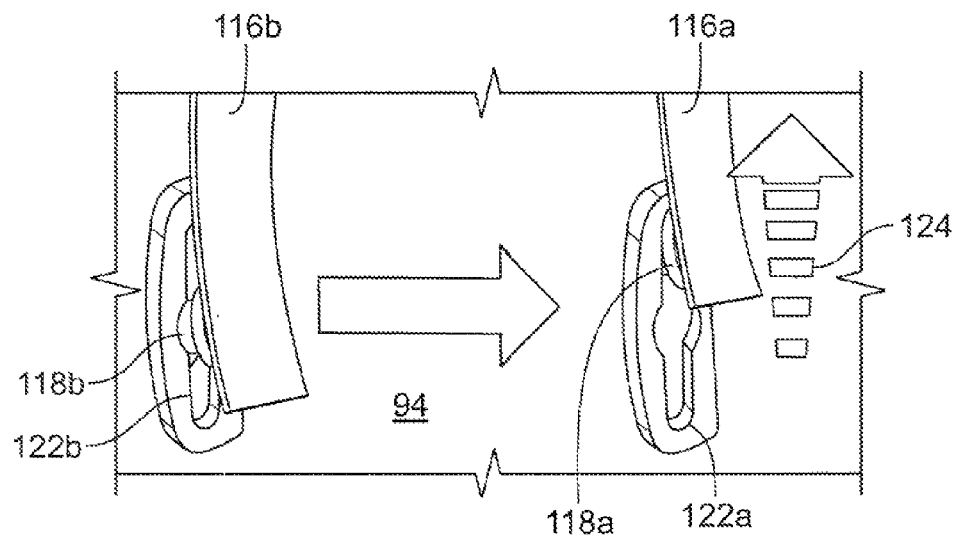

As illustrated in FIGS. 12-14, the pocket of 114 of the infant seat is placed over the top portion of the rear seatback 94. As illustrated in FIGS. 14 and 15, the distal ends of straps 116a and 116b are provided with fasteners 118a, and 118b. Each fastener 118a and 118b features a cylindrical neck portion and, a disc-shaped head portion, with the diameter of the head portion being significantly larger than the diameter of the neck portion (sec FIG. 22A where the construction of fasteners 118a and 118b is identical to that of fastener 138a). As illustrated in FIGS. 14 and 15, the head portion of the fasteners are inserted through the enlarged central portions of slots 122a and 122b positioned on the rear side of the rear seatback 94. As illustrated by arrow 124 in FIG. 15, fastener 118a is then slid upwards within slot 122a so that the distal end of the strap is secured to the seatback. The same step is repeated for fastener 118b with regard to slot 122b.

Figure 16:
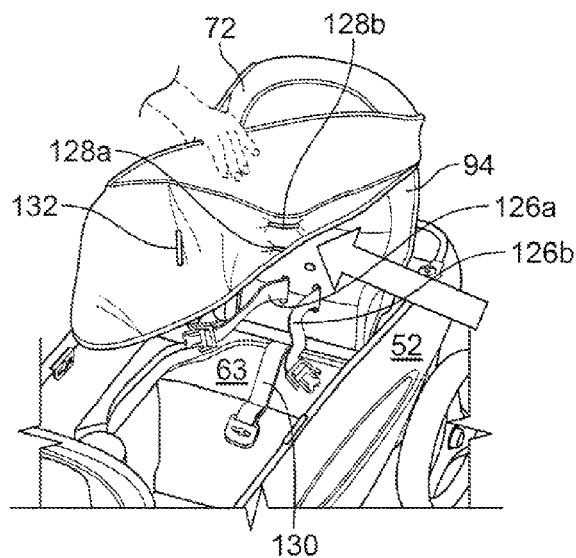
FIGS. 16-18 are perspective views illustrating installation of the infant seat of FIG. 11 on the wagon of FIGS. 1-8.
Figure 17:
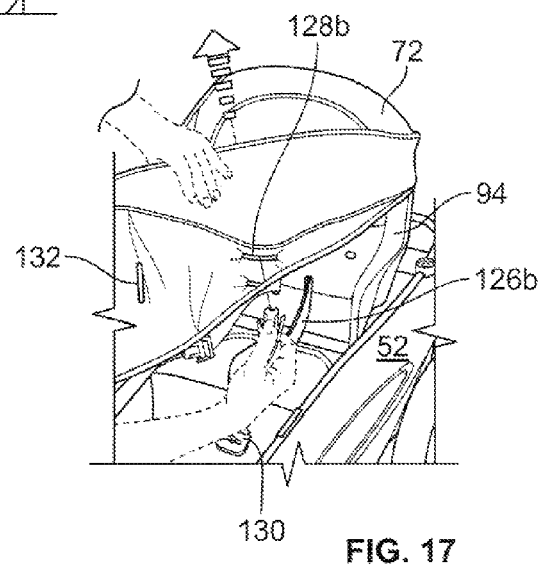
Figure 18:
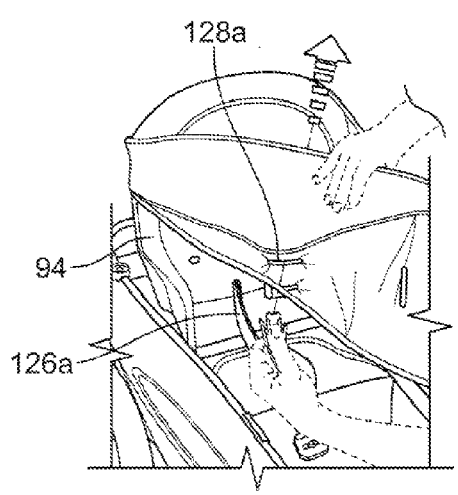

As illustrated in FIGS. 16-18, seat belts 126a and 126b are each fed through corresponding seat belt slots 128a and 128b (also shown in FIGS. 11 and 13) formed in the seatback of the infant seat 72. The central seat belt 130 is fed through slot 132 (also shown in FIGS. 11 and 13) formed in the seating surface portion of the infant seat 72.

Figure 19:
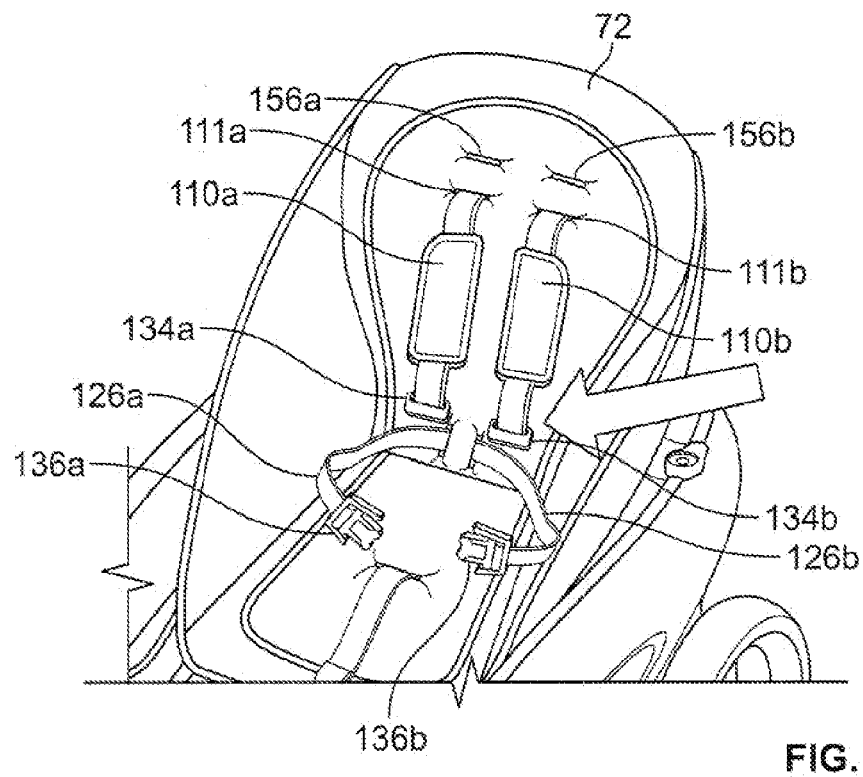
FIGS. 19 and 20 are perspective views illustrating installation of the infant seat of FIG. 11 on the wagon of FIGS. 1-8.
Figure 20:
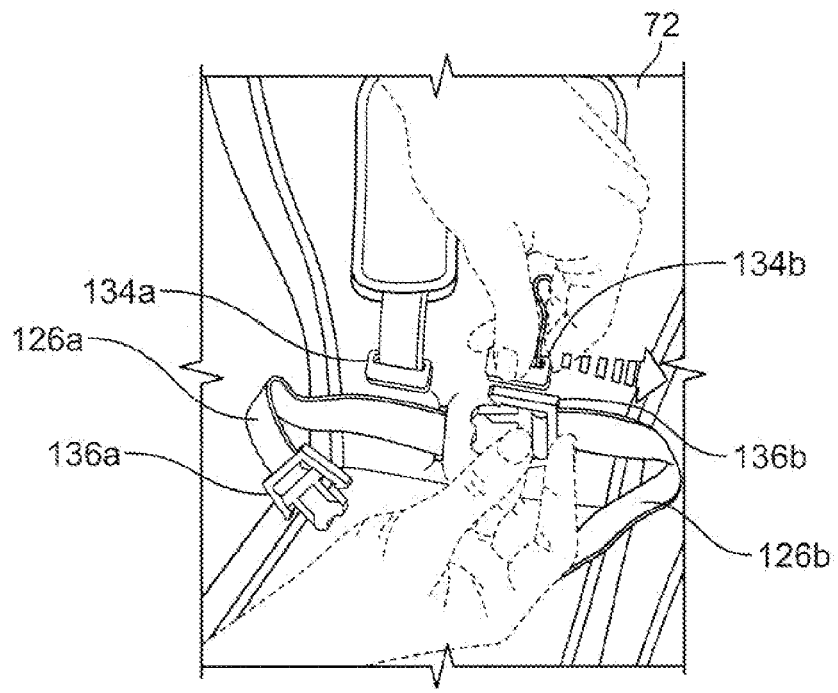

As illustrated in FIGS. 19 and 20, the distal end of each shoulder strap is provided with a clip 134a and 134b that attaches to a corresponding buckle 136a and 136b of the seat belts 126a and 126b.

Figure 22A:
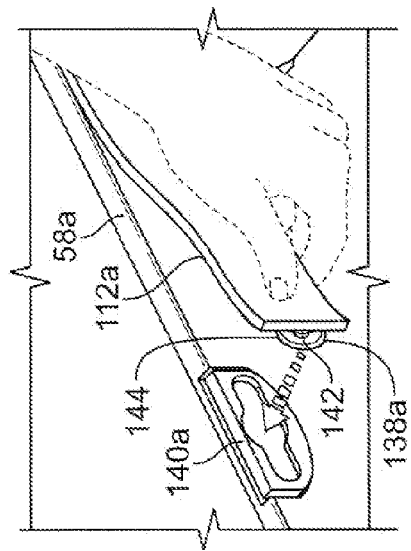
FIGS. 21-22B are perspective views illustrating installation of the infant seat of FIG. 11 on the wagon of FIGS. 1-8.
Figure 22B:
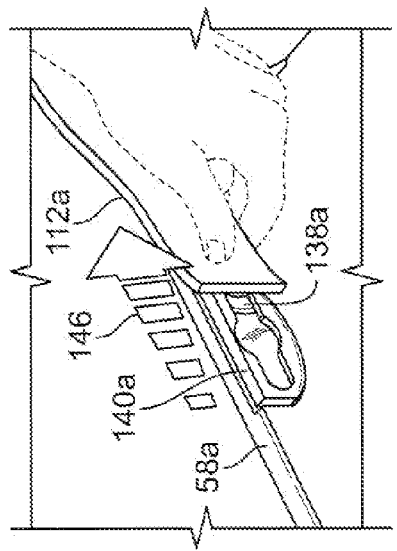
Figure 21:
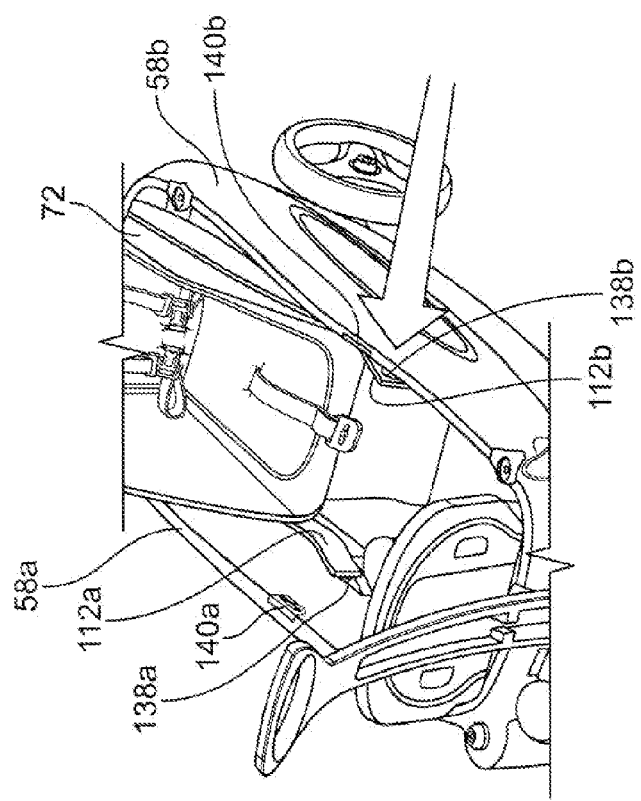
Figure 23A:
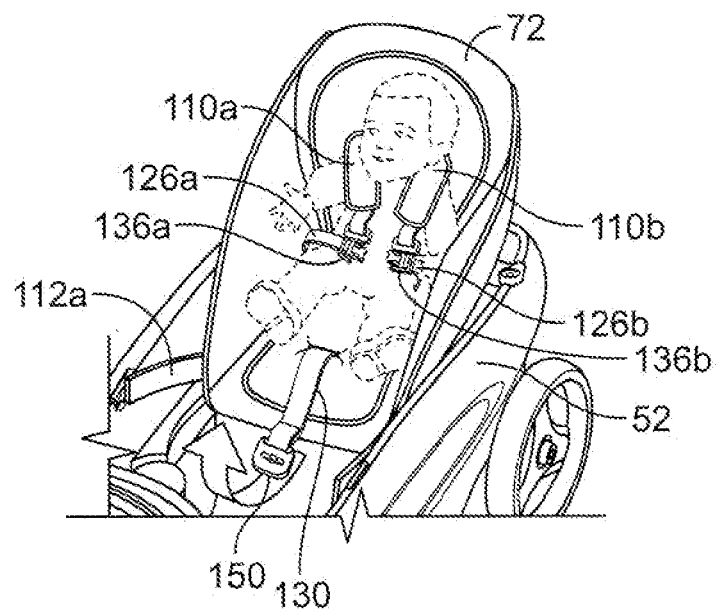
FIGS. 23A-23C are perspective views illustrating the steps taken to fasten a child in the infant seat of FIGS. 1 and 11-22B.

With reference to FIGS. 21, 22A and 22B, installation of the infant seat 72 is completed by connecting the fasteners 138a and 138b, positioned on the distal ends of front wagon attachment straps 112a and 112b, within the slots 140a and 140b positioned on the interior surfaces of wagon sidewalls 58a and 58b. More specifically, as illustrated in FIG. 22A, fastener 138a features a cylindrical neck portion 142 and a disc-shaped head portion 144, with the diameter of the head portion being significantly larger than the diameter of the neck portion. The head portion of the fastener is inserted into the enlarged central portion of slot 140a. The fastener is then moved in the direction of arrow 146 within the slot to lock the fastener 138a, and thus the distal end of strap 112a, in place (as illustrated in FIG. 23A). The same step is repeated for fastener 138b (FIG. 21) with regard to slot 140b.

Figure 23B:
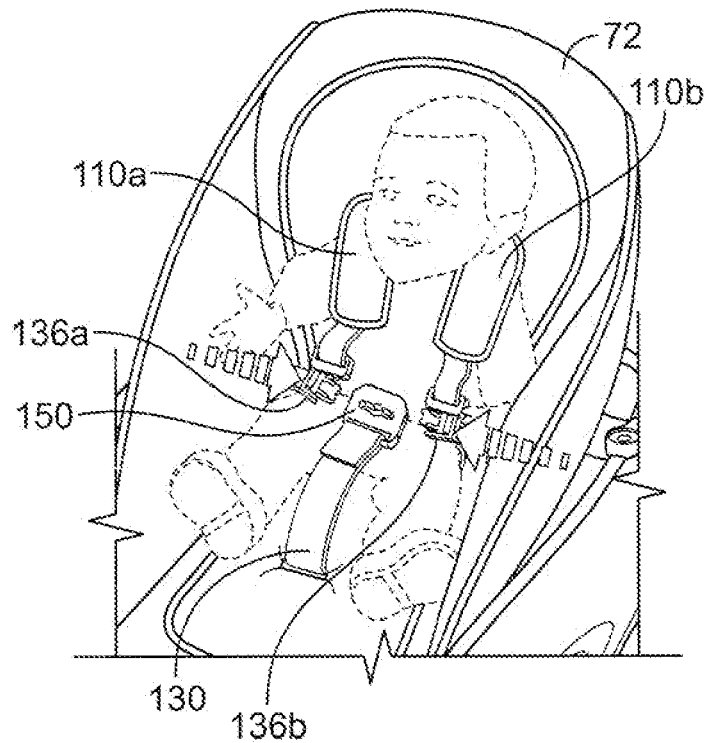
Figure 23C:
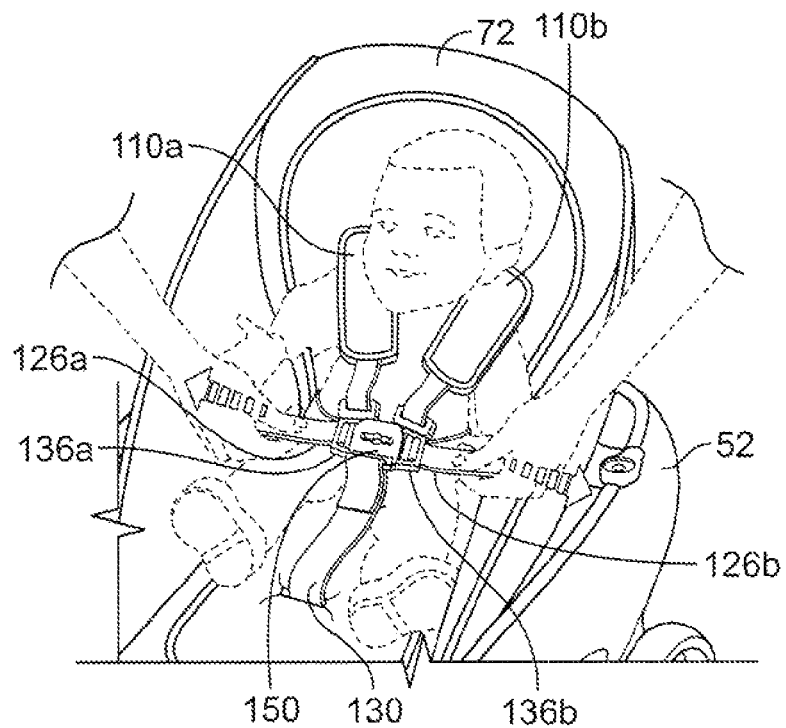
Figure 24A:
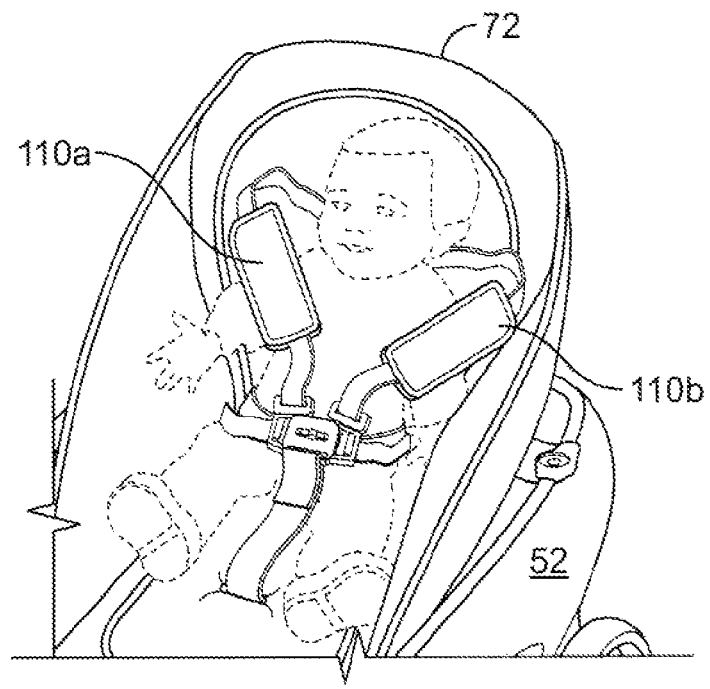
FIGS. 24A-24C are perspective views illustrating the steps taken to loosen the shoulder straps of the infant seat of FIGS. 1 and 11-22B.
Figure 24B:
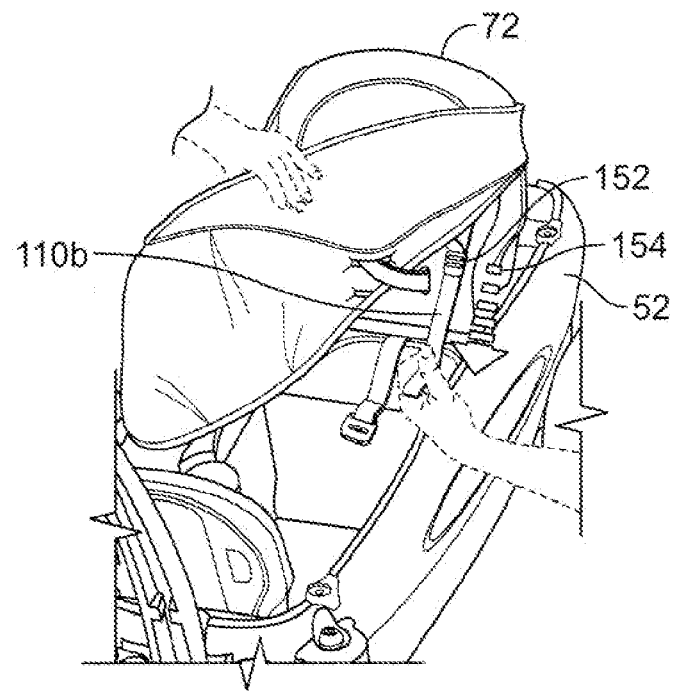
Figure 24C:
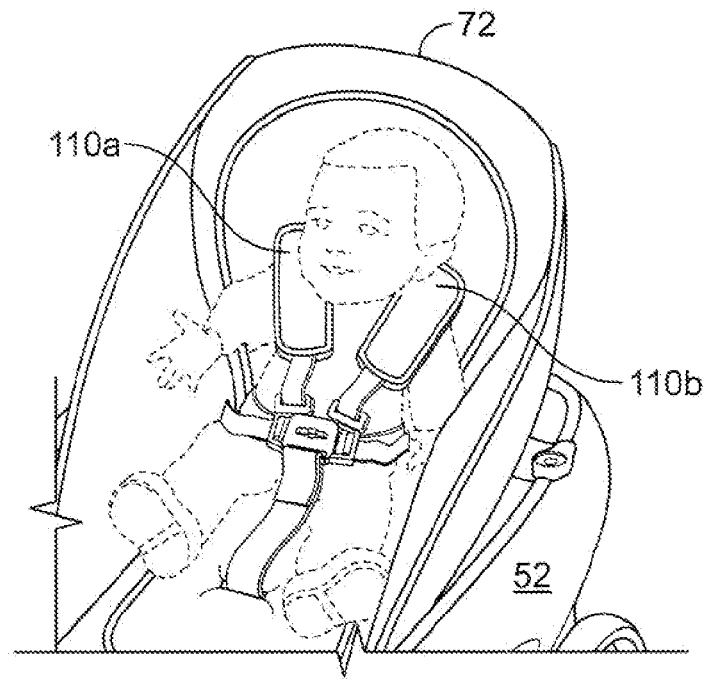
Figure 25B:
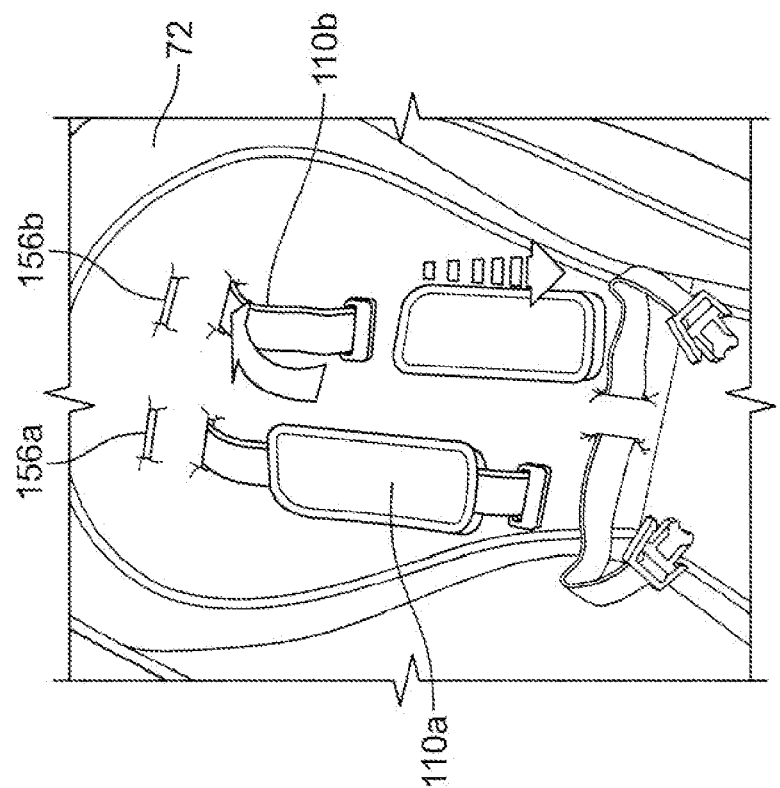
FIGS. 25A-25D are perspective views illustrating the steps taken to raise the height of the shoulder straps of the infant seat of FIGS. 1 and 11-22B.
Figure 25A:
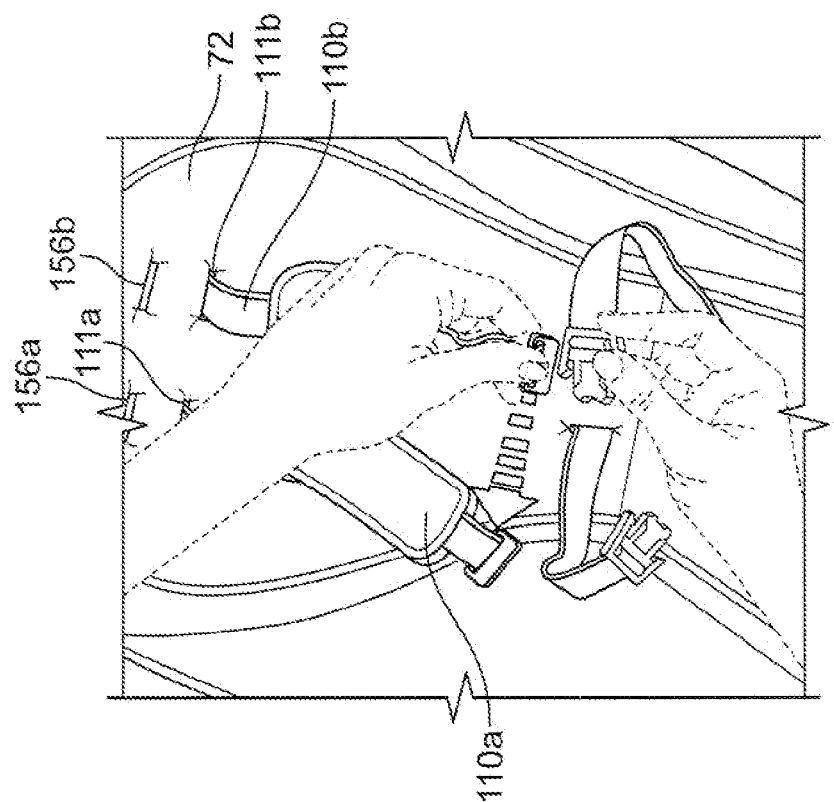
Figure 25D:
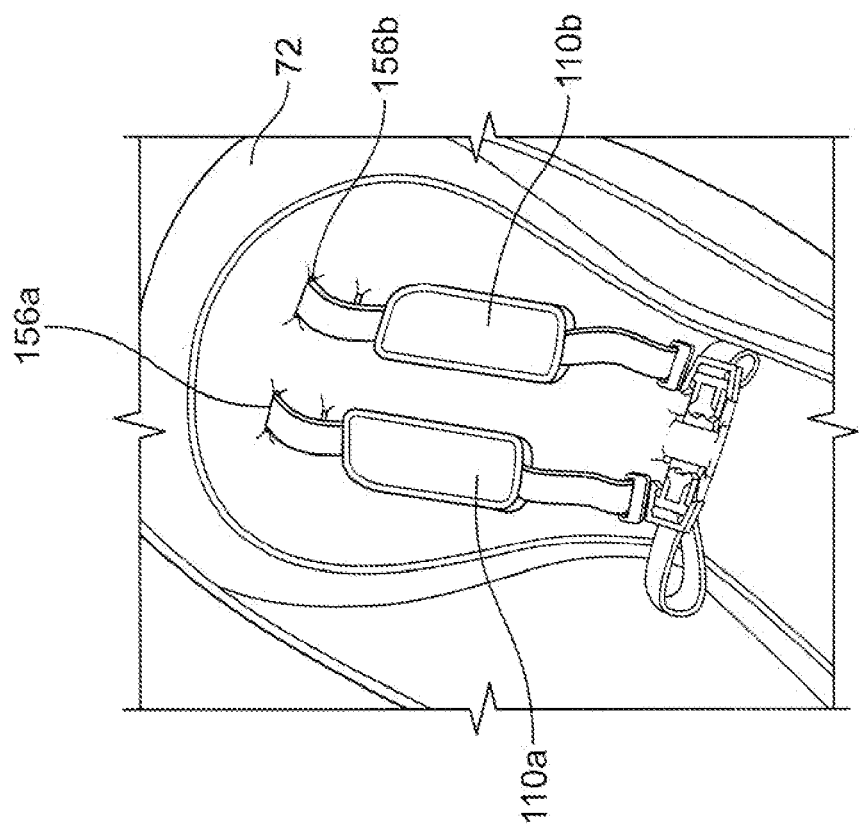
Figure 25C:
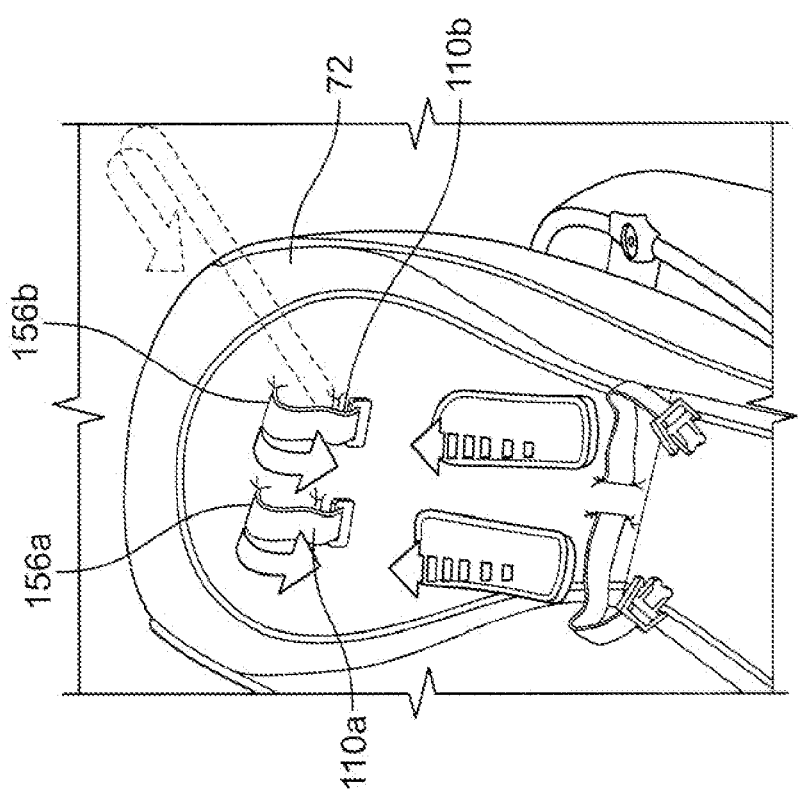

As shown in FIGS. 23A-23C, the buckles 136a and 136b engage the buckle 150 provided on the distal end of central seat belt 130 to provide a child seated within the infant seat with a five-point safety harness. With reference to FIG. 24A, if the shoulder straps 110a and 110b are too loose, the back side of the infant seat is accessed, as illustrated in FIG. 24B, so that the free ends of shoulder straps 110a and 110b may be pulled through buckles 152 (provided for each shoulder strap), as illustrated by arrow 154 for shoulder strap 110b. This results in tightened shoulder straps 110a and 110b, as illustrated in FIG. 24C. The reverse of this operation is performed to loosen the shoulder straps.

As illustrated in FIGS. 25A-25D, the height of the shoulder straps may be adjusted by removing them from slots 111a and 111b and positioning them through slots 156a and 156b (also shown in FIG. 19).

As shown in FIG. 1, front and rear canopies 68 and 69 are removably attached to the body 52 of the wagon 10 by poles 160a, 160b and 162a, 162b, respectively. At the bottom ends of the front poles are clips 164a and 164b, while the rear poles are provided with clips 166a and 166b. Clips 164a, 164b, 166a and 166b all feature the same construction and engage corresponding slots in the wagon body. The clips and sockets preferably take the form of the accessory latching assembly disclosed in commonly owned U.S. Pat. No. 7,625,033 to Michelau et al., the contents of which are hereby incorporated by reference.

Figure 28:
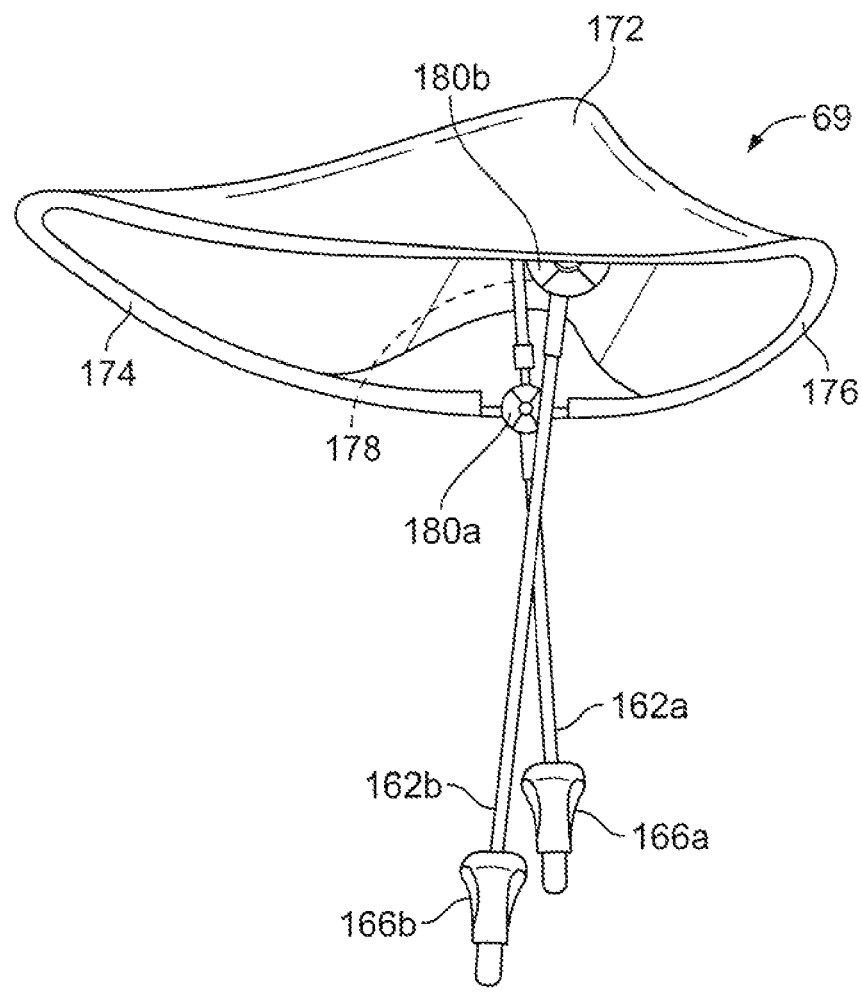
FIG. 28 is a perspective view of the front canopy of the wagon of FIG. 1 prior to installation on the wagon.

As illustrated in FIG. 1, the wagon features adjustable front and rear canopies 68 and 69 to protect occupants from sunlight. With reference to FIGS. 26-28, the rear canopy 69 features a framework to support fabric portion 172 (see also FIG. 1). The framework includes a front spline 174, a rear spline 176, and a middle spline 178. As illustrated in FIG. 28, each spline is generally U-shaped and extends between ratchet mechanisms 180a and 180b, which are mounted to the tops of poles 162a and 162b, respectively.

As illustrated in FIGS. 26 and 27, ratchet mechanism 180a features an outer hub 182 and an inner hub 184. As illustrated in FIGS. 26 and 27, the opposing surfaces of the outer and inner hubs 182 and 184 feature radial protrusions 185 and 187, respectively. The outer and inner hubs are secured together by a rivet 186 positioned through central apertures 190 and 192 formed through each hub. A washer 194 and spring 196 are positioned on the inner end of the rivet 186 and urge the radial protrusions 185 and 187 of the opposing surfaces of the outer and inner hubs towards engagement. Splines 174, 176 and 178 are mounted to the outer hub 182 by pins 197, 198 and 199, respectively, that engage corresponding openings formed in the outer hub. Pole 162a is attached to the inner hub 184 by a socket 179. Ratchet wheel 180b features a similar construction. As a result, the canopy frame may be pivoted in a ratcheting fashion to permit folding of the canopy for storage and adjustment when deployed.

Figure 29A:
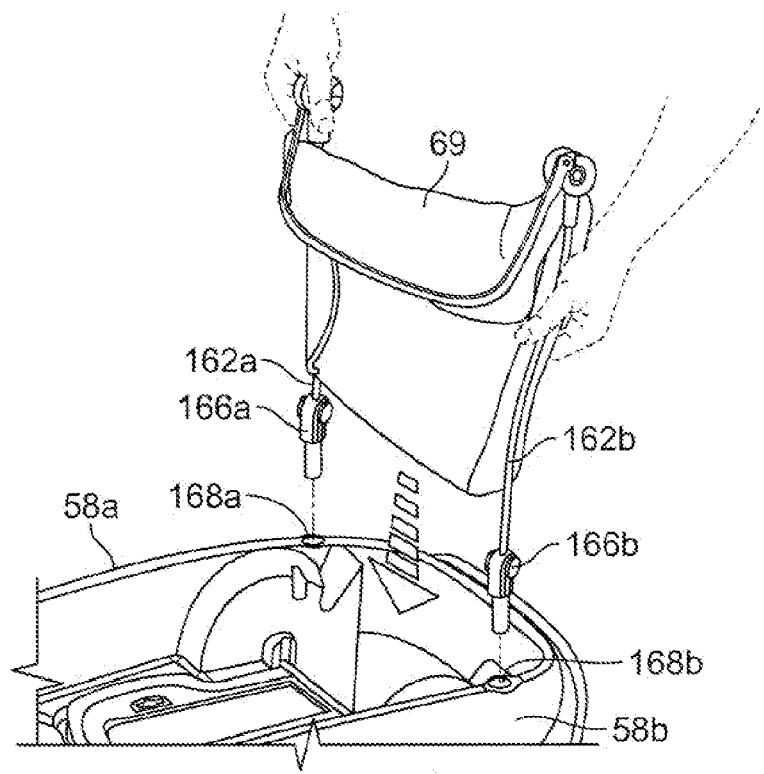
FIGS. 29A-29D are perspective views illustrating installation of the canopy of FIG. 28 on the wagon of FIG. 1.
Figure 29B:
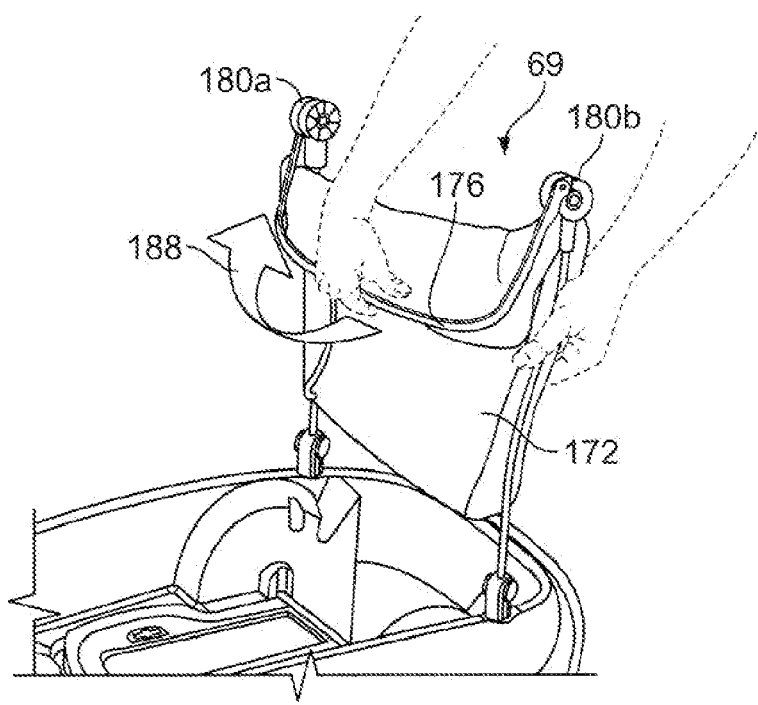
Figure 29C:
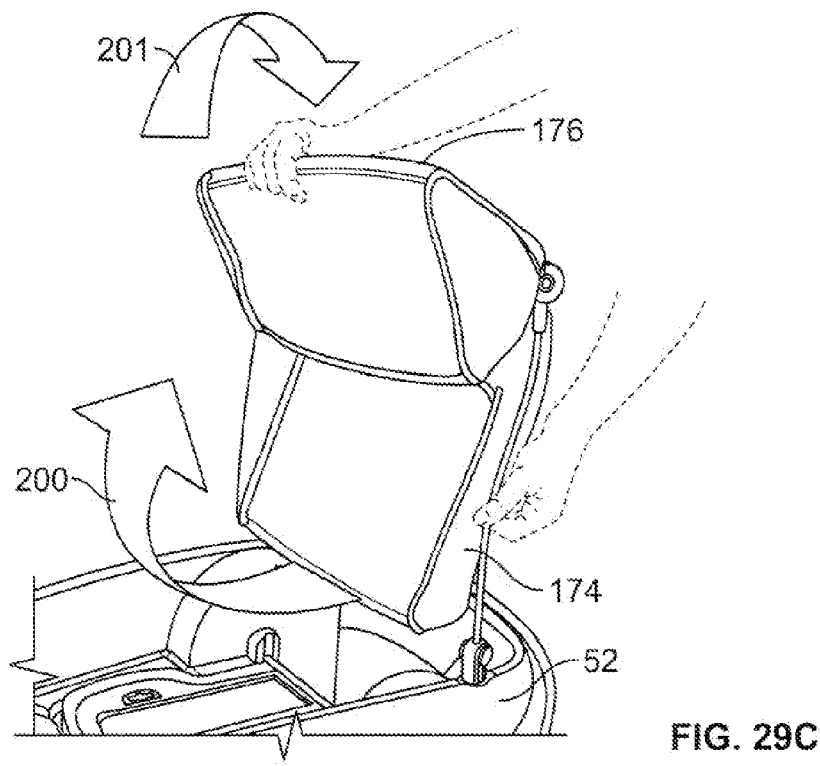
Figure 29D:
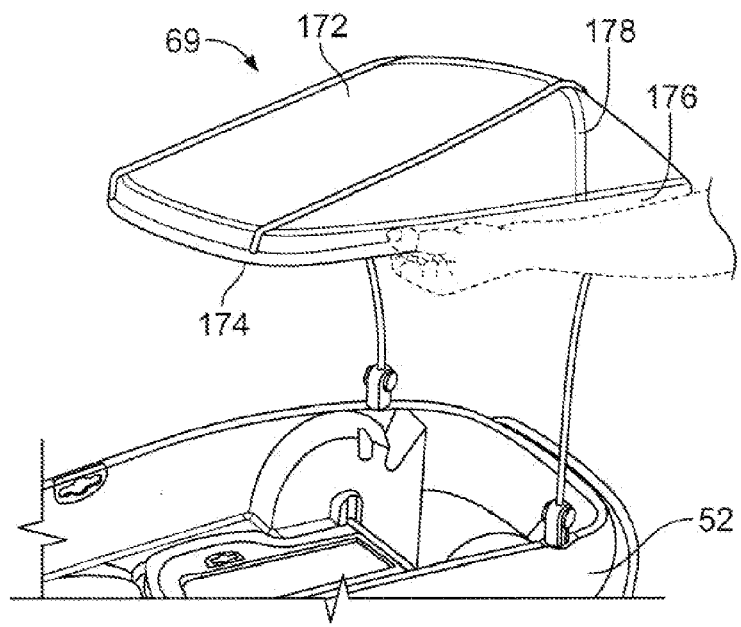

Installation of the rear canopy 69 to the wagon sidewalls 58a and 58b is illustrated in FIGS. 29A-29D. As illustrated in FIG. 29A, the clips 166a and 166b are inserted into and engage corresponding sockets 168a and 168b positioned in the wagon sidewalls 58a and 58b. As illustrated by arrow 188 in FIG. 29B, rear U-shaped tube 176 of the canopy framework is pivoted clockwise to the position shown in FIG. 29C. The user then grasps front U-shaped tube 174 of the canopy framework and, as illustrated by arrows 200 and 201 in FIG. 29C, pivots the front and rear U-shaped, tubes 174 and 176 into the positions shown in FIG. 29D.

Figure 30A:
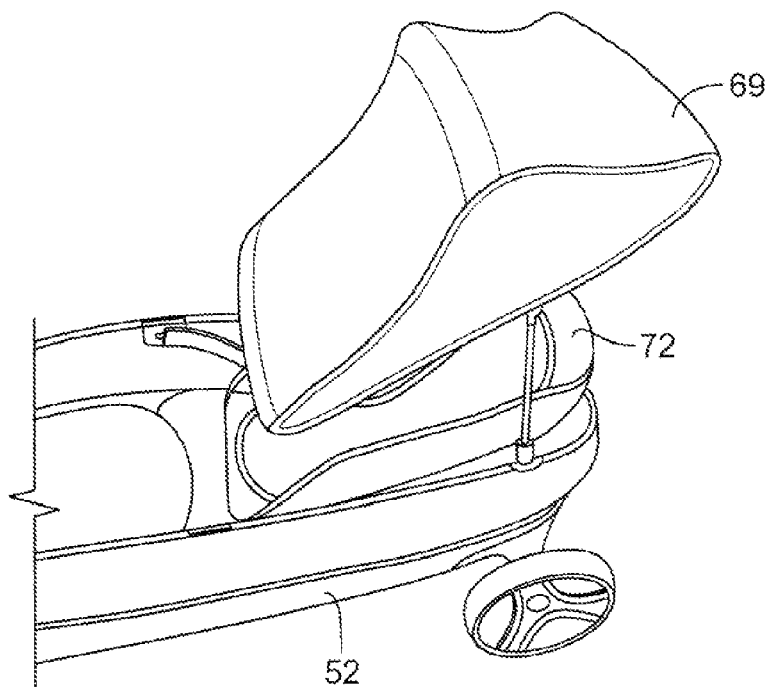
FIGS. 30A-30C are perspective views of the rear portion of the wagon of FIG. 1 illustrating the installed canopy of FIG. 28 in various positions.
Figure 30B:
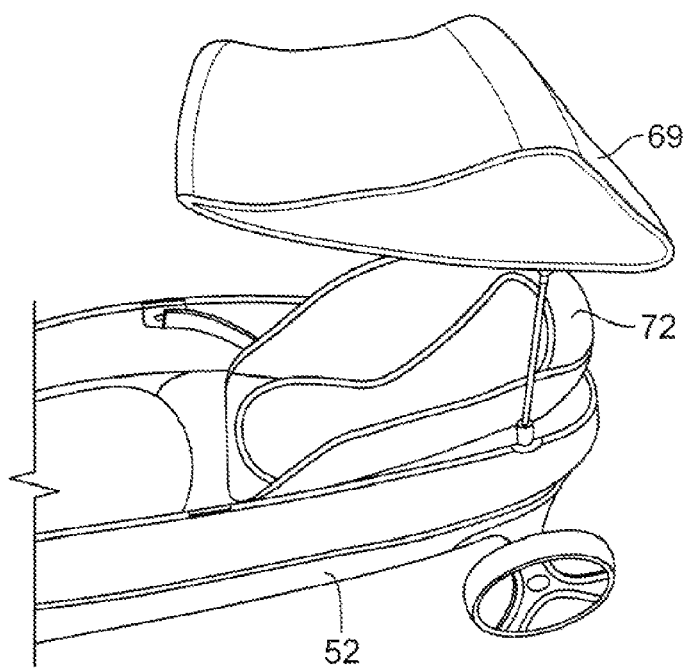
Figure 30C:
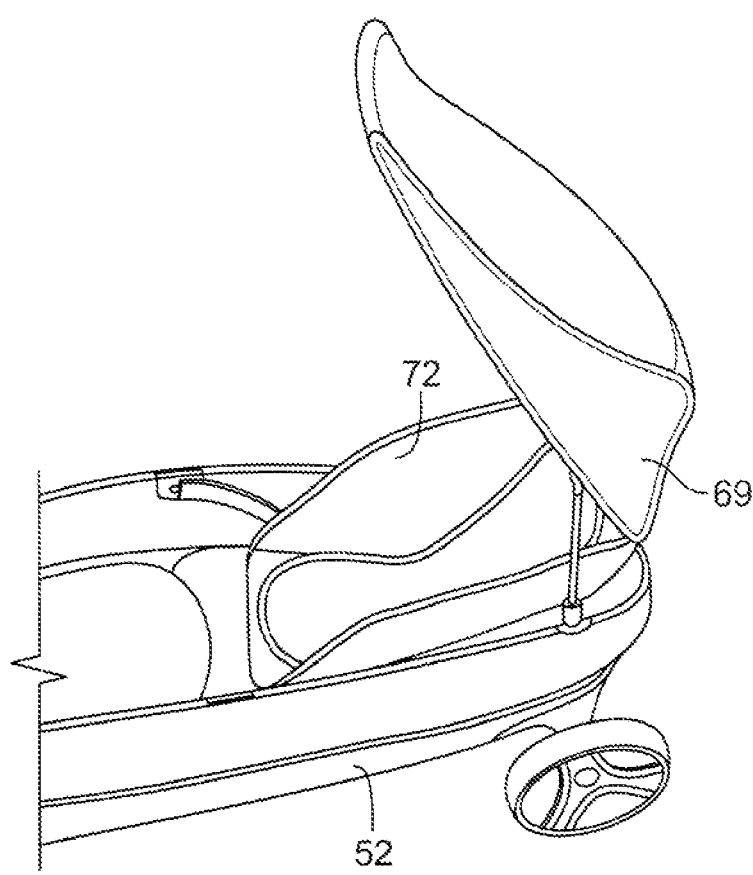

Due to the ratcheting action provided by the ratchet mechanisms 180a and 180b (FIGS. 26-28), once the rear canopy 69 is installed on the wagon, it may be tilted into the positions shown in FIGS. 30A-30C. This permits the canopy 69 to be adjusted to provide the best protection from the sun or other elements for a child seated in infant seat 72, or on the rear seating surface (63 in FIGS. 2-4) or on the flat surface formed when the wagon seatbacks are in the folded position (illustrated in FIG. 9) when the infant seat is not installed.

Figure 31A:
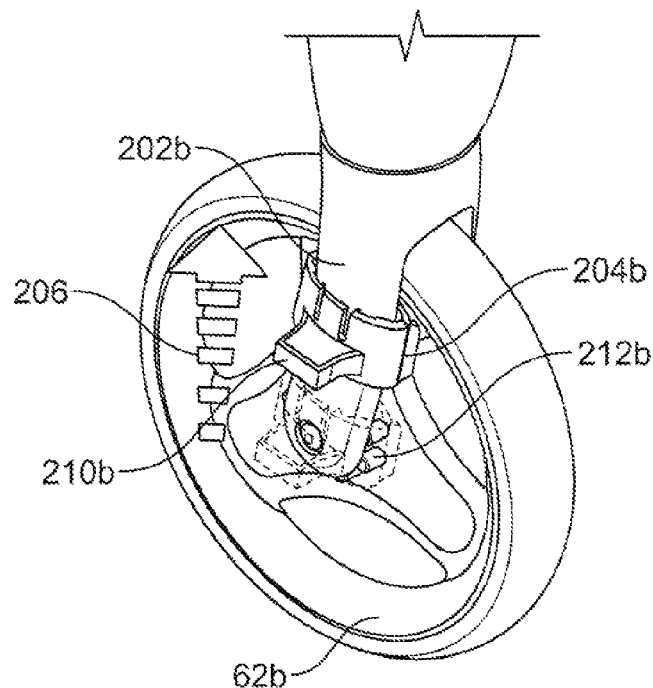
FIGS. 31A and 31B are front perspective views illustrating one of the parking brake mechanisms of the wagon of FIG. 1, in the disengaged/unlocked position and engaged/locked position, respectively.
Figure 31B:
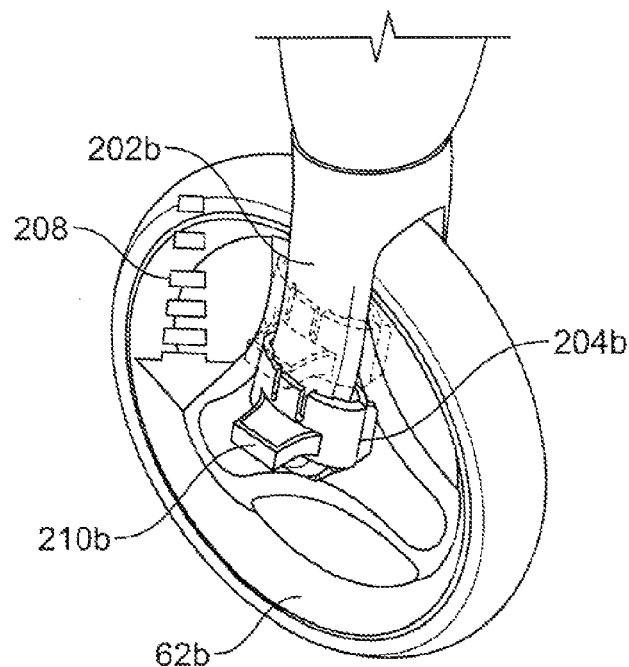
Figure 32:
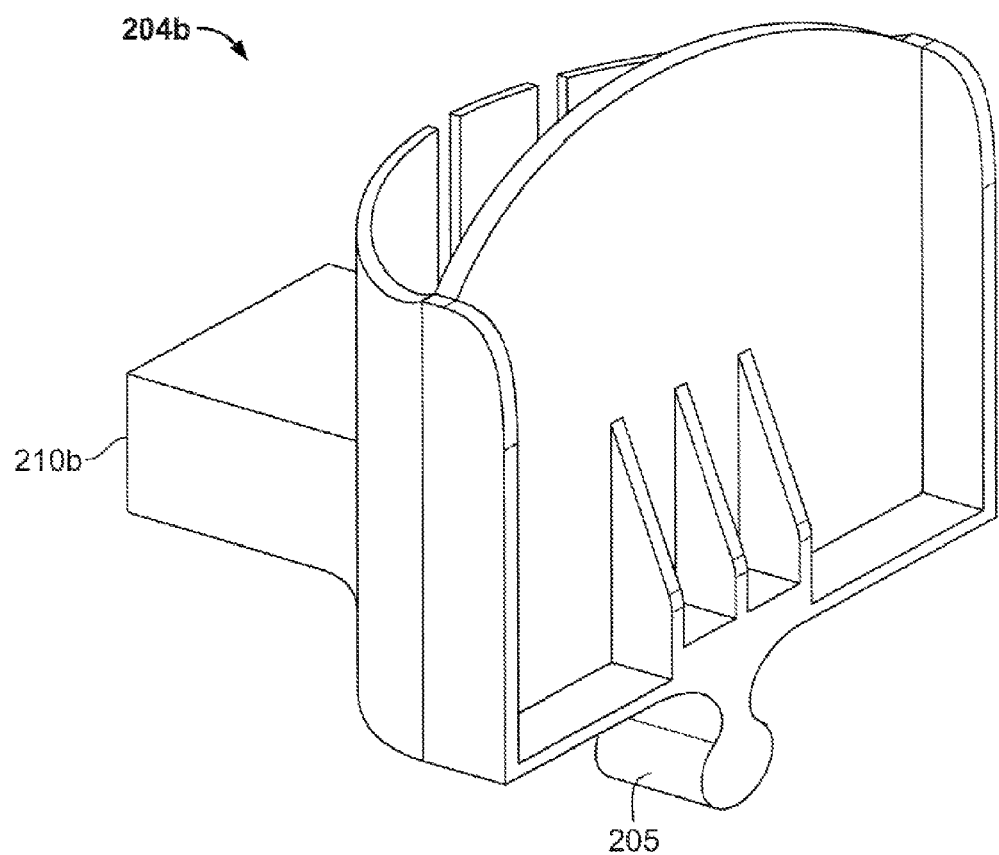
FIG. 32 is an enlarged rear perspective view of the parking brake members of the parking brake mechanism of FIGS. 31A and 31B.

With reference to FIG. 2, as described above, the front wheels 62a and 62b of the wagon are rotatably positioned within caster bodies 74a and 74b, respectively. As is clear from FIG. 2, each caster body features an inner fork and outer fork between which the corresponding caster wheel is received. As illustrated in FIGS. 31A and 31B, the inner fork 202b of the caster body 74b is provided with a parking brake member 204b that slides between the disengaged or unlocked position shown in FIG. 31A and the engaged or locked position shown in FIG. 31B (as indicated by arrows 206 and 208). As illustrated in FIGS. 31A, 31B and 32, the parking brake member 204b features a sleeve-like construction, through which inner fork 202b passes, and a handle 210b that a user engages with his or her hand or foot to set or release the parking brake. With reference to FIG. 32, the parking brake member 204b also features a downwardly protruding, cylindrical-shaped stop 205. As shown in FIG. 31A, the hub of the caster wheel 62b features a number of cylindrical protrusions 212b positioned so as to surround the axle of the caster wheel. When the parking brake member is in the engaged or locked position shown in FIG. 32B, the stop 205 (FIG. 32), which is formed on the portion of the parking brake member 204b that slides between the inner fork 202b and the wheel 62b, engages the protrusions 212b of the caster wheel to prevent it from rolling.

Figure 33:
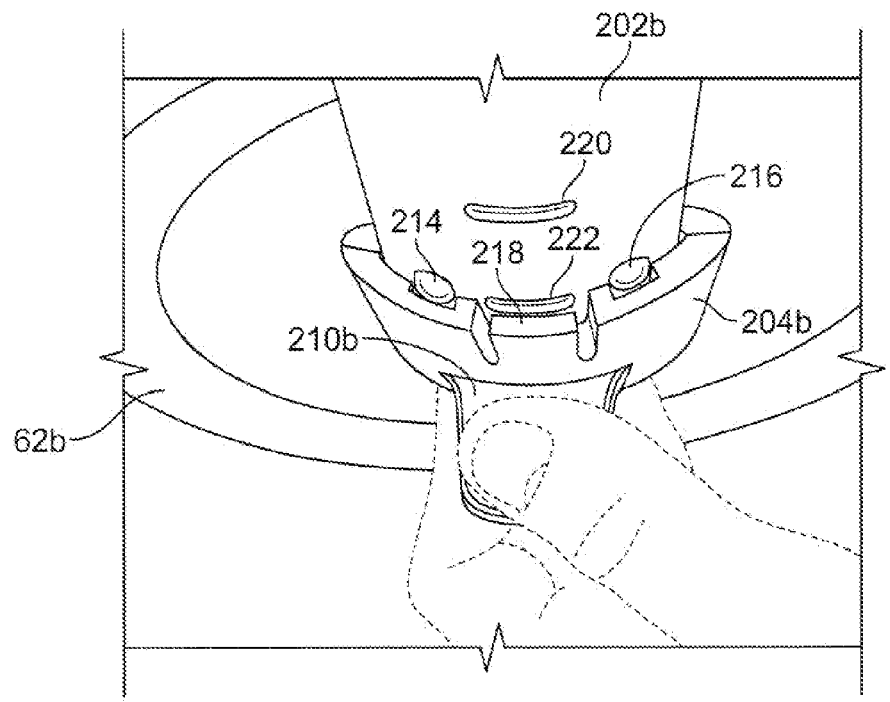
FIG. 33 is a top perspective view illustrating the parking brake member of FIGS. 31A and 31B and 32 being moved from the disengaged/unlocked position of FIG. 31A into the engaged/locked position of FIG. 31B.

As shown in FIG. 33, a pair of guide ridges 214 and 216 are formed on the inner fork 202b and guide the parking brake member 204b as it moves upwards or downwards. The parking brake member also features a tab 218 that engages slots 220 or 222 (also formed in the inner fork 202b) to lock the parking brake member in the selected position (220 for unlocked or disengaged, 222 for locked or engaged). Depressing handle 210b, as illustrated in FIG. 33, causes the tab 218 to be removed from slot 220 or 222 due to a lever action so that the parking brake member 204b may be moved to an alternative position.

As illustrated in FIG. 2, caster housing 74a and wheel 62a are provided with a similar parking brake member 204a, featuring handle 210a, positioned on inner fork 202a and protrusions 212b on the hub of the caster wheel.

Parking brake members 204a and 204b are preferably constructed from molded plastic.

Figure 34:
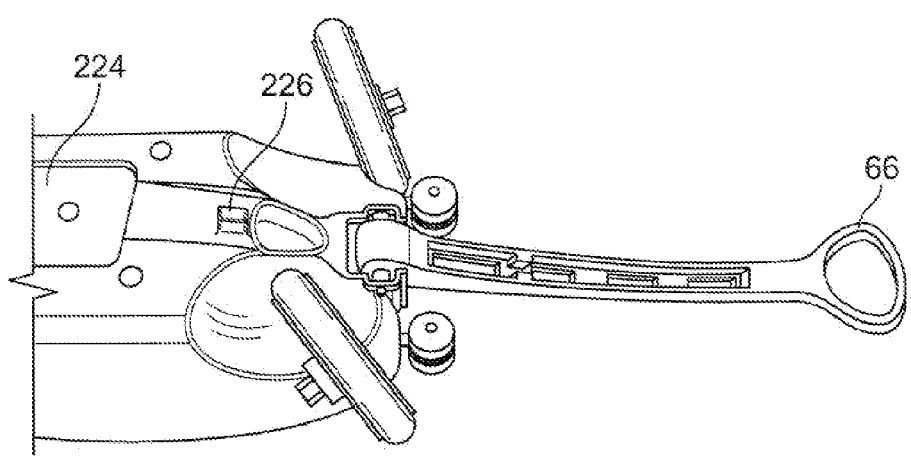
FIG. 34 is a bottom perspective view of the wagon of FIGS. 1-5 with the canopy removed and the handle in an unfolded position.
Figure 35:
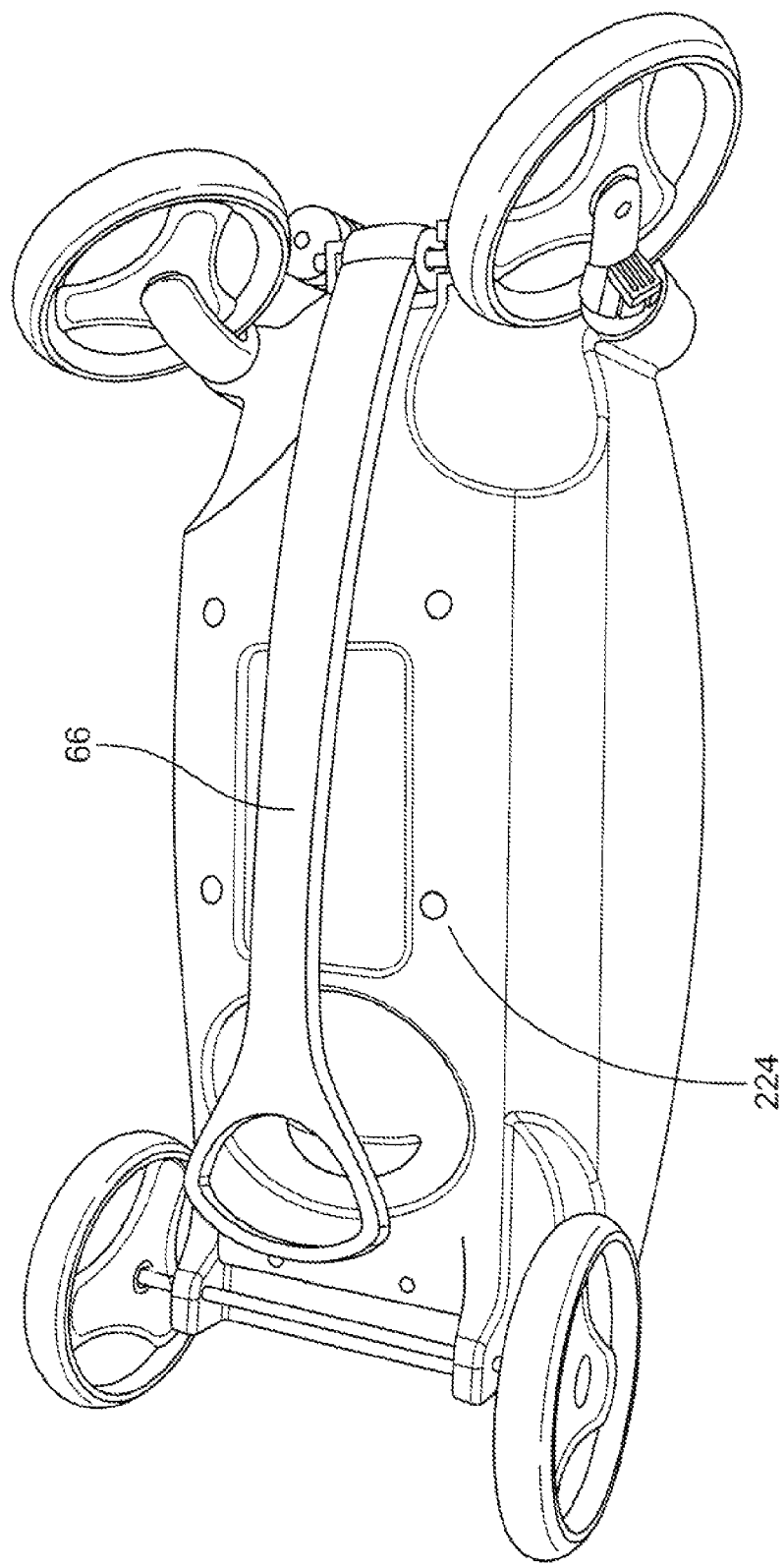
FIG. 35 is a bottom perspective view of the wagon of FIG. 34 with the handle in the folded and stored position.
Figure 36:
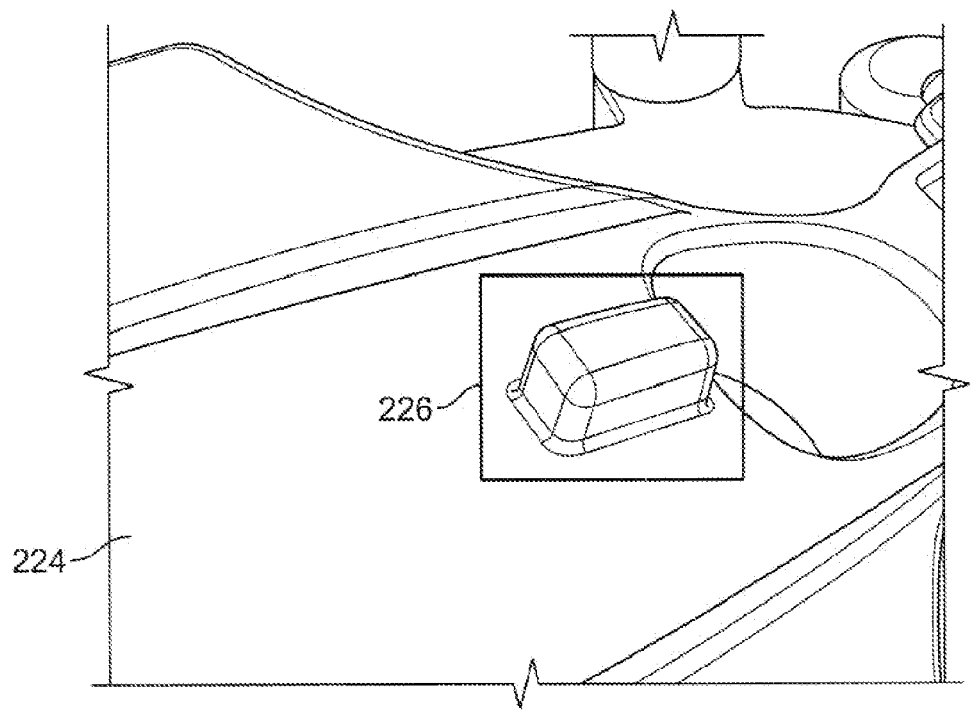
FIG. 36 is an enlarged perspective view of the locking projection of the wagon of FIGS. 34 and 35.
Figure 37:
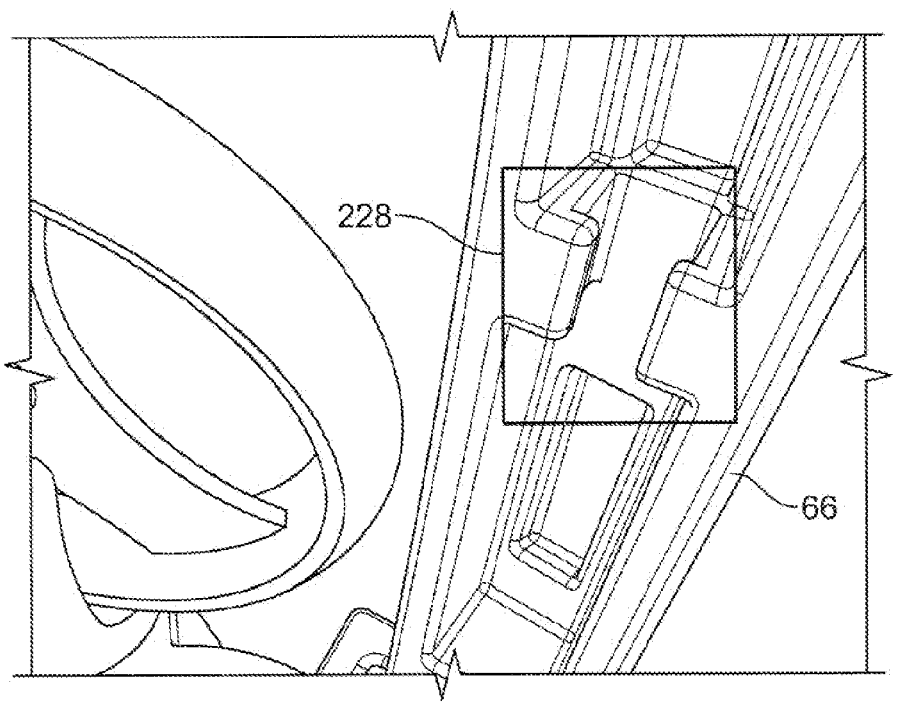
FIG. 37 is an enlarged perspective view of the underside of the handle of the wagon of FIGS. 34 and 35.

The wagon handle 66 may be pivoted from a use position, shown in FIG. 34, to a storage position, illustrated in FIG. 35, where it is positioned along side the bottom surface 224 of the wagon. With reference to FIGS. 36 and 37, the handle 66 is secured in the storage position by a tab 226 (FIG. 36) that is formed on the bottom surface 224 of the wagon and is engaged by a corresponding notch 228 (FIG. 37) formed in the underside of handle 66 when the handle is in the storage position. As a result, the wagon is provided with a compact profile for storage and/or transport. The wagon bottom surface 224 and handle 66 are preferably constructed of molded plastic with the tab 226 and notch 228 molded therein. Of course the tab and notch may alternatively be separately formed and attached or otherwise provided.

While the preferred embodiments of the invention have been shown and described, it will be apparent to those skilled in the art that changes and modifications may be made therein without departing from the spirit of the invention, the scope of which is defined by the appended claims.

What is claimed is:

1. A wagon comprising:
   a. a body having a seating surface;
   b. a plurality of wheels attached to the body;
   c. a handle connected to the body;
   d. a seatback pivotally attached to the body adjacent to the seating surface, said seatback being pivotally positioned in an upright position, a folded position where the seating surface is covered and a reclined position, the upright position and the reclined position both being located at different positions between a horizontal and a vertical position of the seatback, wherein the upright position is located between the folded position and the reclined position; and
   e. an infant seat removably attached to the seatback and located on a front of the seatback when in the reclined position.

2. The wagon of claim 1 wherein the body features opposing sidewalls, each of which features a rear slot, and the seatback features a pair of wings, one each of which engages one of the rear slots when the seatback is in the reclined position.

3. The wagon of claim 2 wherein the body features opposing sidewalls, each of which features a front slot and a rear slot, and the seatback features a pair of wings, one each of which engages one of the front slots when the seatback is in the upright position and one of the rear slots when the seatback is in the reclined position.

4. The wagon of claim 3 wherein each opposing sidewall features a pin slot and the seatback features a pair of pins, one each received within one of the pin slots, said pin slots and pins sized and shaped so as to permit the pins to move vertically within the pin slots as the seatback wings are moved into and out of the front and rear slots of the wagon body opposing sidewalls.

5. The wagon of claim 1 wherein the plurality of wheels includes a front wheel positioned within a caster body, said caster body including an inner fork and an outer fork with the front wheel positioned there between, said caster body pivotally attached to the wagon body.

6. The wagon of claim 5 wherein said front wheel features an axle and a plurality of parking brake protrusions surrounding the axle; and
   further comprising a parking brake member slidably positioned on the inner or outer fork, said parking brake member featuring a stop that engages the parking brake protrusions of the front wheel when the parking brake member is in a locked position and a handle by which a user may slide the parking brake member between the locked position and an unlocked position where the stop of the parking brake member does not engage the parking brake protrusions of the front wheel.

7. The wagon of claim 6 wherein the parking brake member includes a sleeve-like body through which the inner or outer fork passes.

8. The wagon of claim 7 wherein the parking brake member includes a parking brake tab and the inner or outer fork features parking brake slots that are removably engaged by the parking brake tab to secure the parking brake member in either the locked or unlocked positions.

9. The wagon of claim 1 further comprising:
   f. a canopy including:
      i) a pole having a bottom end removably attached to the wagon body;
      ii) a ratchet mechanism positioned on a top end of the pole;
      iii) a fabric portion;
      iv) a framework supporting the fabric portion;
      v) said framework attached to the ratchet mechanism so that the fabric portion may be selectively tilted with respect to the wagon body.

10. The wagon of claim 9 wherein the ratchet mechanism includes:
    A. an inner hub and an outer hub, where said framework is attached to one of the inner hub or the outer hub and the top end of the pole is attached to the other one of the inner hub or the outer hub, said inner and outer hubs having opposing surfaces with radial protrusions;
    B. a rivet passing through the inner and outer hubs;
    C. a spring positioned upon said rivet, said spring urging the radial protrusions of the opposing surfaces of the inner and outer hubs together so that the inner and outer hub may be moved in a ratcheting fashion with respect to one another.

11. The wagon of claim 9 wherein the framework includes a front spline, a rear spline and a middle spline, each of which are connected to the ratcheting mechanism.

12. The wagon of claim 1 wherein the handle pivots with respect to the body between a use position where the wagon may be pulled by a user and a storage position where the handle is adjacent to a bottom surface of the wagon and said bottom surface of the wagon is provided with a handle locking tab and the handle is provided with a handle locking notch which removably receives the handle locking tab to lock the handle in the storage position.

13. The wagon of claim 1 wherein the infant seat includes:
    i) a seating surface portion;
    ii) an infant seatback connected adjacent to the seating surface portion;
    iii) a pocket having an open bottom positioned on a rear side of the infant seatback, said pocket removably engaging the wagon seatback when in the reclined position;
    iv) a pair of front wagon attachment straps attached to the seating surface portion of the infant seat, said pair of front wagon attachment straps featuring distal ends provided with fasteners removably connected to the wagon body.

14. A wagon comprising:
    a. a body having a seating surface;
    b. a plurality of wheels attached to the body;
    c. a handle connected to the body; and
    d. a seatback pivotally attached to the body adjacent to the seating surface, said seatback capable of being pivoted between and residing in three positions, including a folded position where the seating surface is covered, an upright position and a reclined position, wherein the upright position and the reclined position both being located at different positions between a horizontal and a vertical position of the seatback, and wherein the body features opposing sidewalls, each of which features a front slot and a rear slot, and the seatback features a pair of wings, the wings engaging the front slots when the seatback is in the upright position and the wings engaging the rear slots when the seatback is in the reclined position.

15. The wagon of claim 14 wherein each opposing sidewall features a pin slot and the seatback features a pair of pins, one each received within one of the pin slots, said pin slots and pins sized and shaped so as to permit the pins to move vertically within the pin slots as the seatback wings are moved into and out of the front and rear slots of the wagon body opposing sidewalls.

16. The wagon of claim 14 wherein the plurality of wheels includes a front wheel positioned within a caster body, said caster body including an inner fork and an outer fork with the front wheel positioned there between, said caster body pivotally attached to the wagon body.

17. The wagon of claim 16 wherein said front wheel features an axle and a plurality of parking brake protrusions surrounding the axle; and further comprising a parking brake member slidably positioned on the inner or outer fork, said parking brake member featuring a stop that engages the parking brake, protrusions of the front wheel when the parking brake member is in a locked position and a handle by which a user may slide the parking brake member between the locked position and an unlocked position where the stop of the parking brake member does not engage the parking brake protrusions of the front wheel.

18. The wagon of claim 17 wherein the parking brake member includes a sleeve-like body through which the inner or outer fork passes.

19. The wagon of claim 18 wherein the parking brake member includes a parking brake tab and the inner or outer fork features parking brake slots that are removably engaged by the parking brake tab to secure the parking brake member in either the locked or unlocked positions.

20. The wagon of claim 14 wherein the handle pivots with respect to the body between a use position where the wagon may be pulled by a user and a storage position where the handle is adjacent to a bottom surface of the wagon and said bottom surface of the wagon is provided with a handle locking tab and the handle is provided with a handle locking notch which removably receives the handle locking tab to lock the handle in the storage position.

21. A wagon comprising:
  a. a body having a seating surface;
  b. a plurality of wheels attached to the body;
  c. a seatback pivotally attached to the body adjacent to the seating surface, said seatback capable of being pivoted between and residing in three positions, including a folded position where the seating surface is covered, an upright position and a reclined position, wherein the upright position and the reclined position both being located at different positions between a horizontal and a vertical position of the seatback; and,
  d. a canopy including:
    i) a pole having a bottom end removably attached to the wagon body;
    ii) a ratchet mechanism positioned on a top end of the pole;
    iii) a fabric portion;
    iv) a framework supporting the fabric portion;
    v) said framework attached to the ratchet mechanism so that the fabric portion may be selectively tilted with respect to the wagon body.

22. The wagon of claim 21 wherein the ratchet mechanism includes:
  A. an inner hub and an outer hub, where said framework is attached to one of the inner hub or the outer hub and the top end of the pole is attached to the other one of the inner hub or the outer hub, said inner and outer hubs having opposing surfaces with radial protrusions;
  B. a rivet passing through the inner and outer hubs;
  C. a spring positioned upon said rivet, said spring urging the radial protrusions of the opposing surfaces of the inner and outer hubs together so that the inner and outer hub may be moved in a ratcheting fashion with respect to one another.

23. The wagon of claim 21 wherein the framework includes a front spline, a rear spline and a middle spline, each of which are connected to the ratcheting mechanism.

24. A wagon comprising:
  a. a body having a seating surface;
  b. a plurality of wheels attached to the body;
  c. a seatback pivotally attached to the body adjacent to the seating surface, said seatback capable of being pivoted between and residing in three positions, including a folded position where the seating surface is covered, an upright position and a reclined position, wherein the upright position and the reclined position both being located at different positions between a horizontal and a vertical position of the seatback; and,
  d. an infant seat including:
    i) a seating surface portion;
    ii) an infant seatback connected adjacent to the seating surface portion;
    iii) a pocket having an open bottom positioned on a rear side of the infant seatback, said pocket removably engaging the wagon seatback when in the reclined position;
    iv) a pair of front wagon attachment straps attached to the seating surface portion of the infant seat, said pair of front wagon attachment straps featuring distal ends provided with fasteners removably connected to the wagon body.

* * * * *